US009031304B2

(12) United States Patent
Tani

(10) Patent No.: US 9,031,304 B2
(45) Date of Patent: May 12, 2015

(54) IMAGE PROCESSING SYSTEM

(75) Inventor: Shinsuke Tani, Tachikawa (JP)

(73) Assignee: Olympus Corporation, Tokyo (JP)

( * ) Notice: Subject to any disclaimer, the term of this patent is extended or adjusted under 35 U.S.C. 154(b) by 292 days.

(21) Appl. No.: 13/248,499

(22) Filed: Sep. 29, 2011

(65) Prior Publication Data
US 2012/0082364 A1  Apr. 5, 2012

(30) Foreign Application Priority Data

Sep. 30, 2010  (JP) ................................ 2010-222803

(51) Int. Cl.
G06K 9/00  (2006.01)
G06T 7/40  (2006.01)

(52) U.S. Cl.
CPC ....... *G06T 7/408* (2013.01); *G06T 2207/10056* (2013.01); *G06T 2207/30024* (2013.01)

(58) Field of Classification Search
USPC ......................................... 382/133, 131, 128
See application file for complete search history.

(56) References Cited

U.S. PATENT DOCUMENTS

| 6,066,459 | A | * | 5/2000 | Garini et al. | ................. | 435/6.13 |
| 6,980,285 | B1 | * | 12/2005 | Hansen | ........................... | 356/41 |
| 2009/0096914 | A1 | * | 4/2009 | Domenicali | .................. | 348/345 |
| 2009/0202120 | A1 | * | 8/2009 | Otsuka | .......................... | 382/128 |

FOREIGN PATENT DOCUMENTS

| JP | 2009-008481 A | 1/2009 |
| JP | 2009-270890 A | 11/2009 |

OTHER PUBLICATIONS

Fujii, Keiko et al., "Development of support systems for pathology using spectral transmittance—The quantification method of stain conditions," Proceedings of SPIE (2002), vol. 4684, pp. 1516-1523.
Abe, Tokiya et al., "Color Correction of Pathological Images Based on Dye Amount Quantification," Optical Review (2005), vol. 12, No. 4, pp. 293-300.
Japanese Office Action dated Sep. 30, 2014 from related Japanese Patent Application No. 2010-222803.

* cited by examiner

*Primary Examiner* — Matthew Bella
*Assistant Examiner* — Weiwen Yang
(74) *Attorney, Agent, or Firm* — Scully, Scott, Murphy & Presser, P.C.

(57) ABSTRACT

Provided is an image processing system including a multiband signal acquisition unit and a dye spectral property determining unit. The multiband signal acquisition unit acquires a multiband signal value of a subject specimen that has been stained with H&E dyes. The dye spectral property determining unit generates new spectral properties of the H dye and the E dye by varying standard spectral properties previously set to each of the H dye and the E dye according to a spectral property change model, and determines the spectral properties of the H dye and the E dye based on the generated new spectral properties and multiband signal values.

10 Claims, 21 Drawing Sheets

IMAGE PROCESSING SYSTEM

CROSS REFERENCE TO RELATED APPLICATIONS

This application is based upon and claims the benefit of priority from Japanese Patent Application No. 2010-222803, filed on Sep. 30, 2010, the entire contents of which are incorporated herein by reference.

BACKGROUND OF THE INVENTION

1. Field of the Invention

The present invention relates to an image processing system for acquiring the spectral properties of a dye used to stain a specimen.

2. Description of the Related Art

One of the physical quantities expressing a physical property specific to a subject is transmittance. Transmittance is a physical quantity representing the ratio of transmitted light to incident light at each wavelength, and is information that is inherent to an object, having a value that is not affected by outside influences, unlike color information like the RGB value, which varies depending on changes in illumination light. Thus, transmittance is used in various fields of application as information for reproducing the colors of the subjects itself. For example, biological tissue specimens, in particular in the field of pathological diagnosis using pathological specimens, transmittance is used in order to analyze a captured image of a specimen.

In pathological diagnosis, microscopes are used to observe an enlarged view in order to obtain various findings after a block specimen obtained by organ excision or a pathological specimen obtained by needle biopsy is sectioned to a thickness of several microns. Particularly, an observation based on transmittance by using an optical microscope has been one of the most commonly practiced observation methods because the equipments are relatively inexpensive and easy to handle, and because this method has historically been used for many years. Therein, because the thinly sliced specimen essentially neither absorbs nor scatters light and is thus nearly colorless and transparent, staining is generally performed by means of a dye prior to observation.

There have been various methods proposed for staining, the total thereof reaching more than 100 different types, but in particular concerning pathological specimens, the standard has been to use hematoxylin-eosin staining (hereinafter called "H&E staining"), which uses two types of dyes, bluish-purple hematoxylin and red-colored eosin. Hematoxylin is a natural substance extracted from plants, and has no stainability itself. However, hematin, which is an oxide thereof, is a basophilic dye that binds to negatively charged substances. The deoxyribonucleic acid (DNA) contained within the cellular nucleus is negatively charged due to the phosphate groups contained as constituent elements, and therefore binds with hematin and is stained bluish-purple. Even though it is not hematoxylin but rather hematin, the oxide thereof, that possesses stainability, as mentioned above, hematoxylin is generally used to refer to the dye, and this convention is used herein. On the other hand, eosin is an acidophilic dye that binds to positively charged substances. Amino acids and proteins can be charged either positively or negatively depending on the pH environment, and have a strong tendency to be positively charged under acidity. For this reason, acetic acid is sometimes added when using eosin solution. The proteins contained in the cytoplasm are stained pink from red by binding with eosin. In a specimen after H&E staining (a stained specimen), cellular nucleic and bone tissues or the like are stained bluish purple, while the cytoplasm, connective tissue, erythrocytes and the like are stained red, thus becoming easily visible. As a result, the observer is able to ascertain the sizes, positional relationships or the like of the elements constituting the tissue, such as cellular nuclei, and can thus determine the morphological state of the specimen.

Observation of specimens is also carried out by performing multiband image capturing on the specimen for display on the display screen of an external device, in addition to visual inspection by an observer. When displaying on the display screen, then processing for estimating the transmittance at points on the specimen (sample points) from the captured multiband image, processing for estimating the amount of dye used to stain the specimen based on the estimated transmittance, processing for correcting the color of the image based on the estimated amount of dye and the like are performed, thus correcting the properties of the camera and variations in the staining conditions and so on, in order to synthesize a display image which is an RGB image for displaying the specimen. Appropriately estimating the amount of dye makes it possible to correct darkly stained specimens and lightly stained specimens to images having a coloring equivalent to that of a properly stained specimen.

Methods for estimating the transmittance of sample points from a multiband image of a specimen include, for example, an estimation method by principal component analysis (for example, see "Development of support systems for pathology using spectral transmittance—The quantification method of stain conditions," Proceedings of SPIE, Vol. 4684, 2002, p. 1516-1523), or an estimation method by the Wiener estimation (for example, see "Color Correction of Pathological Images Based on Dye Amount Quantification," OPTICAL REVIEW, Vol. 12, No. 4, 2005, p. 293-300). The Wiener estimation is widely known as a linear filtration technique for estimating an original signal from an observed signal on which noise has been superimposed, and is a method for minimizing error by taking into consideration the statistical properties of the object of observation and the properties of noise (observation noise). Because signals from cameras contain a certain amount of noise, the Wiener estimation is very useful as a method for estimating an original signal.

For example, the amount of dye in a specimen can be corrected by using a method such as the Wiener estimation to estimate the amount of dye in each pixel of a multiband image and then virtually adjusting the amount of dye at each corresponding sample point in order to synthesize an adjusted image of the specimen. At this point, automatic color normalization processing is performed, thus making it possible to adjust the amount of dye at each sample point to appropriate staining conditions. Preparing an appropriate user interface also makes it possible for a user to manually adjust the amount of dye. The display image that has been synthesized for display is, for example, displayed on the screen of a display device for use in pathological diagnosis and the like by a doctor and the like. Accordingly, even though a specimen has variations in stain, it is possible to observe the image that has been adjusted to appropriate staining conditions.

Also, small-scale medical facilities lacking staining equipment for specimens will often commission specimen staining to medical facilities that do have staining equipment. The display image is synthesized at the commissioned medical facility by staining the specimen for multiband image capturing, and then performing color normalization processing on the captured multiband image of the specimen. On the other hand, the data of the display image that has been synthesized at the commissioned medical facility is acquired at the commissioning medical facility via a predetermined network, in order to be used for pathological diagnosis and the like. When there is a desire to adjust the staining conditions (the amount of dye) in the display image, the commissioning medical facility again commissions synthesis of a display image from the commissioned medical facility for a second acquisition of the display image data, via the network, in which the amount of dye has been corrected.

SUMMARY OF THE INVENTION

An image processing system according to an aspect of the present invention includes a multiband signal acquisition unit that acquires multiband signal values from a specimen that has been stained with a plurality of dyes; and a dye spectral property determining unit that changes standard spectral properties that have been previously established for each dye of the plurality of dyes according to a prescribed change model to generate new spectral properties for each dye, and determines the spectral properties of each dye based on the new spectral properties and on the multiband signal values.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
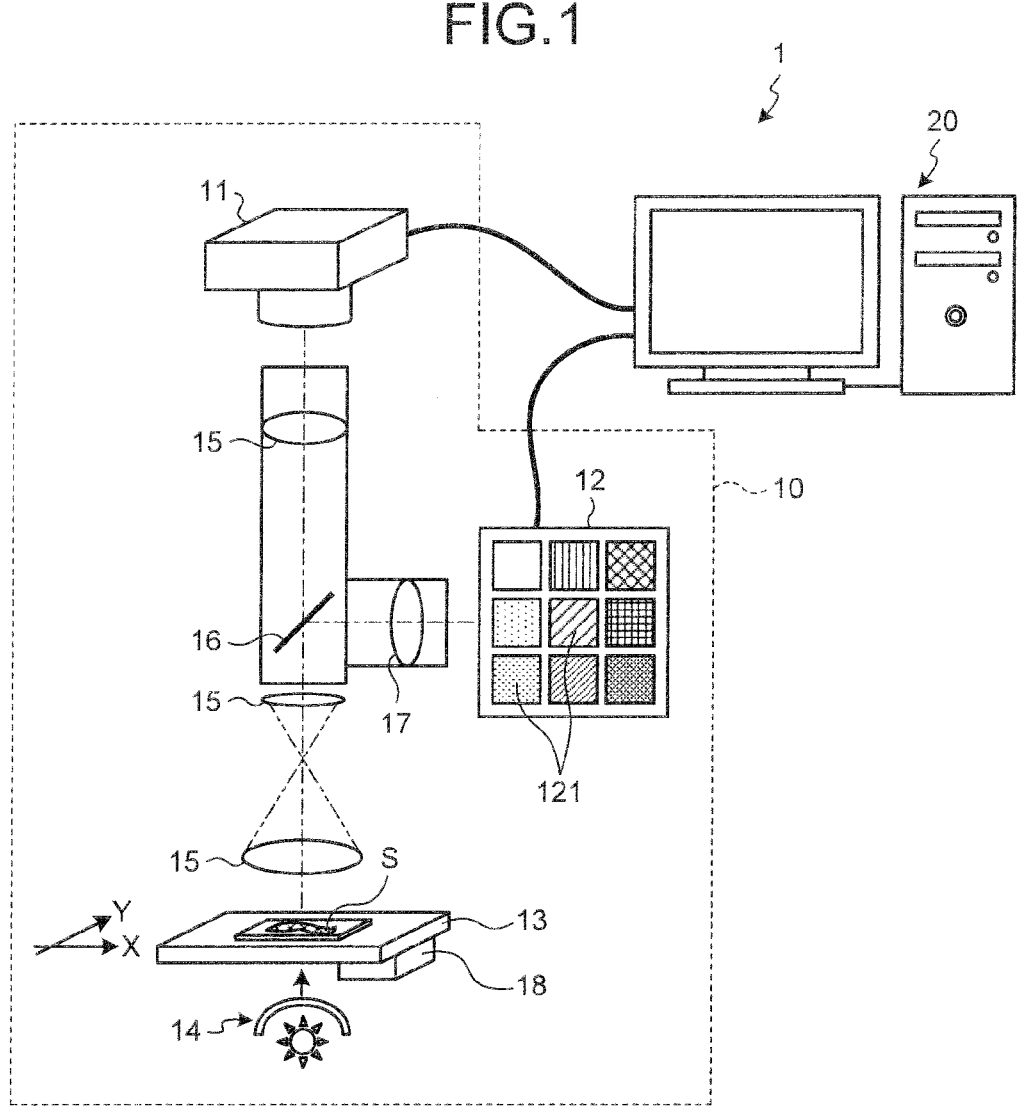
FIG. 1 is a schematic diagram illustrating an example of the overall configuration of the image processing system in a first embodiment.

A description is given below for preferred embodiments of the present invention with reference to the drawings. In these embodiments, the object of observation is made to be a specimen (a biological tissue specimen) that has been subjected to H&E staining. Further, a description is provided for an example of when the specimen (the subject) is, for example, subjected to RGB image capturing such that the resulting RGB image is made into a multiband image of the specimen, and then the dye amounts of the H dye, the E dye and the R dye at each point (sample point) on the specimen is calculated (estimated) from the RGB image serving as a multiband image of the specimen. Hereinafter, the specimen that is to be observed is called the "target specimen", and the RGB image of the target specimen is called the "target specimen image". The dyes that are to be calculated are hematoxylin (the H dye), eosin that has stained the cytoplasm (the E dye), and either eosin that has stained erythrocytes or the color of any unstained erythrocytes (the R dye), where the dye amounts of the H dye, the E dye and the R dye that have been locked into each sample point corresponding to each pixel of the target specimen image are respectively calculated. Note that the present invention is not to be limited by these embodiments. In addition, in descriptions of the drawings, the same components are denoted by the same reference letters or numerals.

Firstly, a description is provided for an example of a method for synthesizing a display image from a multiband image of the specimen.

First of all, a multiband image of the specimen is captured. For example, the simplest method for image capturing would be to capture the multiband image using a commercially available RGB camera. The number of bands in such a case is three bands of R, G and B. Note that the dyes are distributed in three dimensions in the specimen that is the original target of observation, but cannot be directly observed as a three-dimensional image in an ordinary transparent observation system, and therefore the illumination light that has been transmitted through the specimen is observed as the two-dimensional image projected onto the imaging element of the camera. Accordingly, the sample points as mentioned herein signify the points on the specimen that correspond to each projected pixel of the imaging element.

For an arbitrary position (pixel) "x" of a captured multi-band image, a relation expressed by the following Equation (1) based on a response system of the camera is established between a pixel value g(x, b) in a band b and a transmittance t(x, λ) of a corresponding sample point.

$$g(x, b) = \int_\lambda f(b, \lambda) s(\lambda) e(\lambda) t(x, \lambda) d\lambda + n(b) \qquad (1)$$

where λ denotes wavelength, f(b, λ) denotes the transmittance of a b-th filter, s(λ) denotes a spectral sensitivity characteristic of the camera, e(λ) denotes a spectral emission characteristic of illumination, and n(b) denotes observation noise in the band b. Here, b is a serial number for identifying bands, and is an integer that herein satisfies 1≤b≤3.

In practical calculation, the following Equation (2) obtained by discretizing Equation (1) in a wavelength direction is used.

$$G(x) = FSET(x) + N \qquad (2)$$

When the number of samples in the wavelength direction is designated as D and the number of bands is designated as B (herein B=3), then G(x) denotes a matrix of B rows and one column corresponding to a pixel value g(x, b) at a pixel x. Similarly, T(x) is a matrix of D rows and one column corresponding to a t(x, λ), and F is a matrix of B rows and D columns corresponding to an f(b, λ). On the other hand, S is a diagonal matrix of D rows and D columns, where a diagonal element corresponds to an s(λ). Similarly, E is a diagonal matrix of D rows and D columns, where a diagonal element corresponds to an e(λ). N is a matrix of B rows and one column corresponding to n(b). Note that in Equation (2), because expressions relating to a plurality of bands are put together using matrices, no explicit description is provided in Equation (2) for a variable b expressing the bands. Additionally, an integral relating to a wavelength λ is replaced by a product of matrices.

Herein, in order to simplify notation, a matrix H defined by the following Equation (3) is introduced.

$$H = FSE \qquad (3)$$

where H is also called as system matrix.

Accordingly, Equation (3) is replaced by the following Equation (4).

$$G(x) = HT(x) + N \qquad (4)$$

Next, the Wiener estimation (for example, see "Color Correction of Pathological Images Based on Dye Amount Quantification", OPTICAL REVIEW, Vol. 12, No. 4, 2005, p. 293-300) is used to estimate the transmittance at sample point from the captured multiband image. An estimated value of the transmittance (the transmittance data) $\hat{T}(x)$ can be calculated by the following equation (5).

$$\hat{T}(x) = WG(x) \qquad (5)$$

Herein, W is expressed by the following Equation (6), and is referred to as either the "Wiener estimation matrix" or the "estimation operator used in the Wiener estimation".

$$W = R_{SS} H^t (H R_{SS} H^t + R_{NN})^{-1} \qquad (6)$$

Herein, ( )$^t$ expresses a transposed matrix, and ( )$^{-1}$ expresses an inverse matrix.

In the following description, W is simply referred to as the "estimation operator". $R_{SS}$ is a matrix of D rows and D columns, and represents an autocorrelation matrix of the transmittance of the specimen. Also, $R_{NN}$ is a matrix of B rows and B columns, and represents an autocorrelation matrix of the noise of the camera used for imaging. Note that the transmittance F of the optical filter constituting the system matrix H represented by Equation (5), the spectral sensitivity characteristic S of the camera, the spectral emission characteristic E of illumination, the $R_{SS}$ term expressing the statistical properties of the object of observation, and the $R_{NN}$ term expressing the characteristic of image noise are all acquired in advance.

After thus estimating the transmittance data $\hat{T}(x)$, the amounts of dye at corresponding sample points are estimated based on $\hat{T}(x)$. The dyes that are to be estimated are considered to be hematoxylin, eosin that has stained cytoplasm, and other staining components such as dyes like eosin that has stained erythrocytes, or the original unstained erythrocytes and the like, which are abbreviated as the H dye, the E dye and the R dye, respectively. Herein, strictly speaking, the erythrocytes are observed by superimposing the color of the erythrocytes themselves and the color of the eosin that has changed during the staining process. For this reason, to be precise, the two are combined and referred to as the R dye. Note that there is no limitation to treating the hematoxylin as a single dye, and the same hematoxylin may be treated as separate dyes depending on the stained tissue or on the state of the stained tissue. The same is true with eosin.

Generally, it is known that the Lambert-Beer Law, represented by the following Equation (7) between an intensity $I_0(\lambda)$ of incident light and an intensity $I(\lambda)$ of emitted light at each wavelength λ holds true in substances that transmit light.

$$\frac{I(\lambda)}{I_0(\lambda)} = e^{-k(\lambda) \cdot d} \qquad (7)$$

where k(λ) denotes a value specific to a substance determined depending on the wavelength, and d denotes a respective thickness of the substance. The left side of Equation (7) signifies a transmittance t(λ), and Equation (7) is replaced by the following Equation (8).

$$t(\lambda) = e^{-k(\lambda) \cdot d} \qquad (8)$$

Further, an absorbance a(λ) is represented by the following Equation (9).

$$a(\lambda) = k(\lambda) \cdot d \qquad (9)$$

Accordingly, the equation (8) is replaced by the following Equation (10).

$$t(\lambda) = e^{-a(\lambda)} \qquad (10)$$

When an H&E stained specimen is stained with the three kinds of dyes: the H dye, the E dye, and the R dye, then the following Equation (11) holds true at each wavelength λ according to the Lambert-Beer Law.

$$\frac{I(\lambda)}{I_0(\lambda)} = e^{-(k_H(\lambda) d_H + k_E(\lambda) d_E + k_R(\lambda) d_R)} \qquad (11)$$

where $k_H(\lambda)$, $k_E(\lambda)$, and $k_R(\lambda)$ each respectively denote the k(λ) corresponding to the H dye, the E dye, and the R dye, and, for example, are spectral properties of each dye that has stained the specimen. Further, $d_H$, $d_E$, and $d_R$ each respectively indicate a virtual thickness of the H dye, the E dye and, the R dye at each sample point corresponding to each pixel of the multiband image. The original dyes exist in the specimen as dispersion, and thus the concept of "thickness" is not accurate, but serves as an index of the relative dye amount that indicates how much dye is present as compared to when the sample is assumed to have been stained with a single dye. That is, it can be said that $d_H$, $d_E$, and $d_R$ each respectively indicate the dye amount of the H dye, the E dye, and the R dye. Note that $k_H(\lambda)$, $k_E(\lambda)$, and $k_R(\lambda)$ are calculated using the Lambert-Beer Law, for example, by preparing specimens that are stained individually by using the H dye, the E dye, and the R dye (hereinafter referred to as "single-stain specimen") and measuring the spectral properties thereof with a spectrometer.

Herein, Equation (9) is replaced by the following Equation (12) when the transmittance at a position "x" is taken as $t(x,\lambda)$ and the absorbance at the position "x" is taken as $a(x,\lambda)$.

$$a(x, \lambda) = k_H(\lambda) \cdot d_H + k_E(\lambda) \cdot d_E + k_R(\lambda) \cdot d_R \quad (12)$$

Further, Equation (12) is replaced by the following Equation (13) when estimated transmittance at a wavelength $\lambda$ of the transmittance $\hat{T}(x)$ estimated using the equation (5) is taken as $\hat{t}(x, \lambda)$, and the estimated absorbance is taken as $\hat{a}(x, \lambda)$.

$$\hat{a}(x, \lambda) = k_H(\lambda) \cdot d_H + k_E(\lambda) \cdot d_E + k_R(\lambda) \cdot d_R \quad (13)$$

In Equation (13), since there are three unknown variables $d_H$, $d_E$, and dR, the same can be solved when simultaneous Equations (13) are acquired for at least three different wavelengths $\lambda$. To further improve accuracy, simultaneous Equations (13) may be acquired for four or more different wavelengths $\lambda$ in order to perform a multiple regression analysis. For example, acquired simultaneous Equations (13) for the three wavelengths $\lambda_1$, $\lambda_2$, and $\lambda 3$ can be expressed in a matrix as the following Equation (14).

$$\begin{pmatrix} \hat{a}(x, \lambda_1) \\ \hat{a}(x, \lambda_2) \\ \hat{a}(x, \lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (14)$$

Herein, Equation (14) is replaced by the following Equation (15).

$$\hat{A}(x) = Kd(x) \quad (15)$$

When the number of samples in the wavelength direction is D, then $\hat{A}(x)$ is a matrix of D rows and one column corresponding to $\hat{a}(x,\lambda)$, K is a matrix of D rows and three columns corresponding to $k(\lambda)$, and $d(x)$ is a matrix of three rows and one column corresponding to $d_H$, $d_E$, and $d_R$ at a pixel x.

Further, according to Equation (15), the dye amounts $d_H$, $d_E$, and $d_R$ are calculated using the method of least squares. The method of least squares is a method for determining $d(x)$ such that the square sum of error is minimized in a single regression equation, and can be calculated by the following Equation (16).

$$\hat{d}(x) = (K^T K)^{-1} K^T \hat{A}(x) \quad (16)$$

where $\hat{d}(x)$ is an estimated dye amount.

When the dye amounts $\hat{d}_H$, $\hat{d}_E$, and $\hat{d}_R$ are estimated for the H dye, the E dye, and the R dye and then substituted into Equation (12), a restored restoration absorbance $\tilde{a}(x, \lambda)$ can be obtained according to the following Equation (17).

$$\tilde{a}(x, \lambda) = k_H(\lambda) \cdot \hat{d}_H + k_E(\lambda) \cdot \hat{d}_E + k_R(\lambda) \cdot \hat{d}_R \quad (17)$$

Herein, an estimated error $e(\lambda)$ in the estimation of the dye amount is obtained based on the estimated absorbance $\hat{a}(x, \lambda)$ and the restored absorbance $\tilde{a}(x, \lambda)$ according to the following Equation (18).

$$e(\lambda) = \hat{a}(x, \lambda) - \tilde{a}(x, \lambda) \quad (18)$$

Further, the estimated absorbance $\hat{a}(x, \lambda)$ can be represented by the following Equation (19) based on Equations (17) and (18).

$$\hat{a}(x, \lambda) = k_H(\lambda) \cdot \hat{d}_H + k_E(\lambda) \cdot \hat{d}_E + k_R(\lambda) \cdot \hat{d}_R + e(\lambda) \quad (19)$$

The Lambert-Beer Law is intended to formulate attenuation of the light transmitting through a translucent substance, assuming that there is no refraction or scattering. However, in an actual specimen, refraction and scattering can occur. Therefore, when attenuation of light by the specimens is modeled using only the Lambert-Beer Law, an error resulting from the refraction or scattering occurs. However, it is extremely difficult to construct a model that includes refraction or scattering. Thus, unnatural color variation by a physical model can be prevented by taking into consideration the estimated error $e(\lambda)$, which is a modeling error that includes the effects of refraction and scattering.

When the dye amounts $\hat{d}_H$, $\hat{d}_E$, and $\hat{d}_R$ are determined in this manner, changes in the dye amounts in the specimen can be simulated by correcting the dye amounts. Herein, the dye amounts $\hat{d}_H$ and $\hat{d}_E$ that have been stained by a staining method are corrected, and $\hat{d}_R$ which is the color of the original erythrocytes, is not corrected. That is, the corrected dye amounts $\hat{d}_H^*$ and $\hat{d}_E^*$ can be obtained by using appropriate dye-amount correction coefficients $\alpha_H$ and $\alpha_E$ according to the following Equations (20) and (21).

$$\hat{d}_H^* = \alpha_H \hat{d}_H \quad (20)$$

$$\hat{d}_E^* = \alpha_E \hat{d}_E \quad (21)$$

When the obtained corrected dye amounts $\hat{d}_H^*$ and $\hat{d}_E^*$ are submitted in Equation (12), an absorbance $\tilde{a}^*(x, \lambda)$ can be obtained according to the following Equation (22).

$$\tilde{a}^*(x, \lambda) = k_H(\lambda) \cdot \hat{d}_H^* + k_E(\lambda) \cdot \hat{d}_E^* + k_R(\lambda) \cdot \hat{d}_R \quad (22)$$

Further, when the estimated error $e(\lambda)$ is included, then a new absorbance $\hat{a}^*(x, \lambda)$ can be obtained according to Equation (23).

$$\hat{a}^*(x, \lambda) = k_H(\lambda) \cdot \hat{d}_H^* + k_E(\lambda) \cdot \hat{d}_E^* + k_R(\lambda) \cdot \hat{d}_R + e(\lambda) \quad (23)$$

When the absorbance $\tilde{a}^*(x, \lambda)$ or absorbance $\hat{a}^*(x, \lambda)$ is substituted into the equation 10, then a new transmittance $t^*(x,\lambda)$ is obtained according to Equation (24).

$$t^*(x, \lambda) = e^{-a^*(x,\lambda)} \quad (24)$$

In Equation (24), the absorbance $a^*(x,\lambda)$ is a value of either the absorbance $\tilde{a}^*(x, \lambda)$ or the absorbance $\hat{a}^*(x, \lambda)$.

Further, when Equation (24) is substituted into Equation (1), a new pixel value $g^*(x,b)$ can be obtained by the following Equation (25). In this case, the calculation may be made while assuming the observation noise $n(b)$ to be zero.

$$g^*(x, b) = \int_\lambda f(b, \lambda) s(\lambda) e(\lambda) t^*(x, \lambda) d\lambda \quad (25)$$

Herein, Equation (4) is replaced by the following Equation (26).

$$G^*(x) = HT^*(x) \quad (26)$$

where $G^*(x)$ is a matrix of B rows and one column corresponding to $g^*(x,b)$, and $T^*(x)$ is a matrix of D rows and one column corresponding to $t^*(x,\lambda)$. Accordingly, a pixel value $G^*(x)$ of the specimen in which the dye amount has been virtually changed can be synthesized.

First Embodiment

FIG. 1 is a schematic diagram illustrating an example of the overall configuration of an image processing system 1 in a first embodiment. As illustrated in FIG. 1, in the image processing system 1, a microscope imaging system 10 and a computer 20 such as a personal computer configured to be connected so as to be able to send and receive data.

The microscope imaging system 10 performs RGB image capturing on a partial region or the entire region of the target specimen (hereinafter called the "RGB imaging area") to acquire RGB signal values, and also performs multiband image capturing on a prescribed view within the RGB imaging area (hereinafter called the "multiband signal acquisition view") to acquire multiband signal values. In addition to an RGB signal acquisition unit 11 serving as a multiband image acquisition unit for acquiring RGB signal values and a multiband signal acquisition unit 12 for acquiring multiband signal values, the microscope imaging system 10 further includes a stage 13 onto which the target specimen S is placed; an illumination unit 14 for providing transmitted illumination onto the target specimen S on the stage 13; plural optical lenses 15 such as objective lenses, and imaging lenses which perform imaging by condensing transmitted light from the target specimen S; a half-mirror 16 for diverting the optical path of the transmitted light so as to be incident on the RGB signal acquisition unit 11 and the multiband signal acquisition unit 12; a diffusion optical system 17 disposed between the half-mirror 16 and the multiband signal acquisition unit 12; a stage drive unit 18 for moving the stage 13 on the XY plane; and the like.

The RGB signal acquisition unit 11 is constituted of an RGB camera provided with an imaging element such as a CCD, and acquires an RGB image of the prescribed view (the RGB imaging area) as a target specimen image depending on the magnification of the objective lens. The RGB camera is one that is widely used in digital cameras and the like, and may be a single-panel type RGB camera on which a Bayer color filter for each color of RGB is arranged on the monochrome imaging element, or may also be a three-panel configuration. The RGB camera is mounted such that the center of the captured RGB image is positioned on the optical axis of the illumination light. Note that a multiband camera that captures multiband images of N bands (N>1) may be used instead of the RGB camera.

Figure 2:
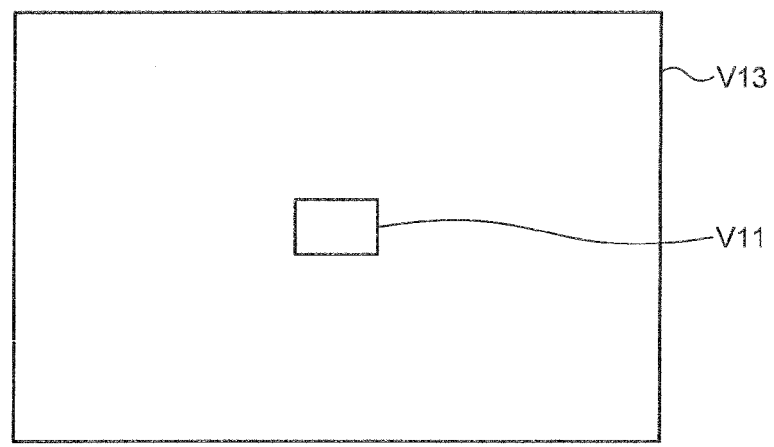
FIG. 2 is a schematic diagram illustrating the RGB imaging area and the multiband signal acquisition view within this RGB imaging area in the first embodiment.

The multiband signal acquisition unit 12 sets a prescribed region within the RGB imaging area as the multiband signal acquisition view, and acquires multiband signal values in the multiband signal acquisition view in synchronization with the acquisition of RGB signal values by the RGB signal acquisition unit 11. The multiband signal acquisition unit 12 is constituted of, for example, a multiband sensor 121 in which M sensors (M N; in FIG. 1, M equals 9) are arranged with different spectral properties (observed wavelength), and is installed such that the center of the multiband signal acquisition view is positioned on the optical axis of the illumination light. FIG. 2 is a diagram illustrating the multiband signal acquisition view V11 in the first embodiment, together with the RGB imaging area (view of the RGB camera) V13 of the target specimen image. In the first embodiment, as illustrated in FIG. 2, the multiband signal acquisition unit 12 acquires multiband signal values by taking the center position of the RGB imaging area V13 (within the target specimen image) as the multiband signal acquisition view V11.

Herein, the diffusion optical system 17, which is arranged between the half-mirror 16 and the multiband signal acquisition unit 12, causes the transmitted light transmitted through a region within the multiband signal acquisition view of the target specimen S to be incident on the multiband signal acquisition unit 12 as homogeneously diffused light. The multiband signal values acquired by means of the multiband signal acquisition unit 12 have a poorer spatial resolution than the RGB signal values acquired by means of the RGB signal acquisition unit 11, because the transmitted light that is incident is made into diffused light by the diffusion optical system 17, but making the number of bands (the number of sensors 121) greater than the number of bands in the RGB camera (M N; in the first embodiment, N is the three R, G, and B bands) enables acquisition as high-resolution signal values in the wavelength direction.

Note that the configuration of the multiband signal acquisition unit 12 is not limited to a configuration using multiband sensors. For example, the configuration may be such that the multiband signal values are acquired by interchanging the positioning of the M band-pass filters with different spectral properties within the optical path of the transmitted light. The configuration may also be such that the multiband signal values are acquired by emitting the illumination light while also interchanging plural light sources emitting light of different wavelengths. Alternatively, the configuration may be such that the multiband signal values are acquired by disposing an optical system that splits the transmitted light into a plurality, and sensors with different spectral properties for respectively the split destination. The RGB signal acquisition unit 11 and the multiband signal acquisition unit 12 may also be constituted of a single multiband sensor, where the configuration is such that both the RGB signal values and the multiband signal values are acquired by means of the single multiband sensor.

Figure 3:
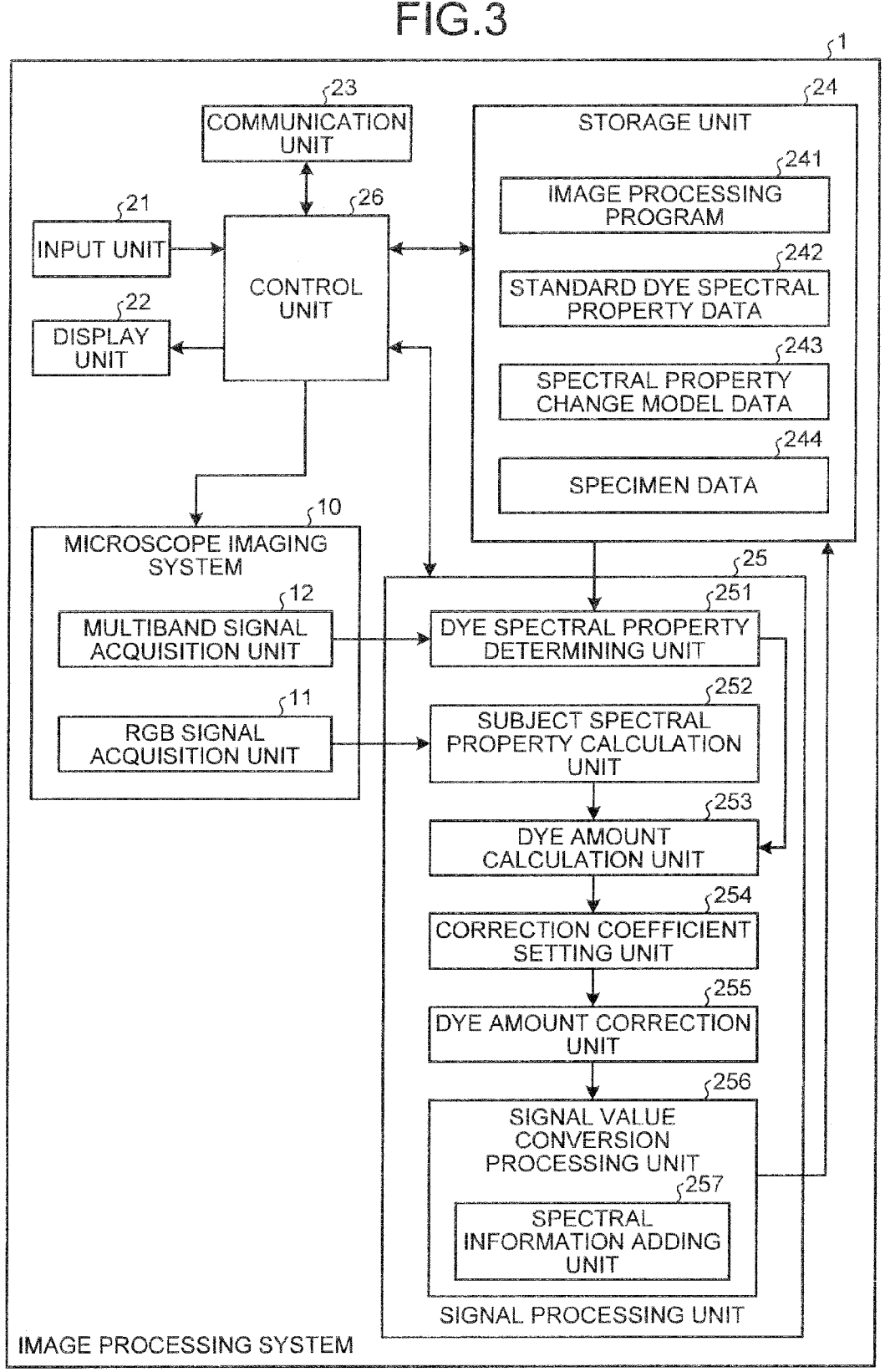
FIG. 3 is a block diagram illustrating an example of the functional configuration of the image processing system in the first embodiment.

FIG. 3 is a block diagram illustrating an example of the functional configuration of the image processing system 1 in the first embodiment. As illustrated in FIG. 3, the image processing system 1 is provided with the microscope imaging system 10 described by the illustration in FIG. 1, an input unit 21, a display unit 22 serving as the image display unit, a communication unit 23, a storage unit 24, a signal processing unit 25, and a control unit 26 that controls each unit of the apparatus.

The input unit 21 is one that can be implemented by means of various input devices such as, for example, a keyboard and mouse, a touch screen, or various switches, for outputting to the control unit 26 the input signals corresponding to the operation input. The display unit 22 is one that can be implemented by means of a display device such as an LCD, EL display or a CRT display, and displays various screen images based on the display signals that are input from the control unit 26. The communication unit 23 performs data communication with outside via a prescribed communication network. The communication unit 23 is implemented by means of a modem, TA, a jack of the communication cable, a control circuit and the like.

The storage unit 24 is one that can be implemented by means of various kinds of IC memory like ROM or RAM such as flash memory, which can store updates; a built-in hard disk or one connected by a data communication terminal; or an information recording medium and the reading device therefore, such as CD-ROM. The storage unit 24 stores a program for operating the image processing system 1 and for carrying out the various functions included in the image processing system 1, and previously stores data and the like for use during the execution of the program, or temporarily stores the same for each processing. For example, the storage unit 24 stores an image processing program 241 for acquiring the spectral properties of the dyes (in the first embodiment, the H dye and the E dye) used to stain the target specimen when the processing of the first embodiment is being carried out. The storage unit 24 further stores standard dye spectral property data 242, spectral property change model data 243, and specimen data 244.

Figure 4:
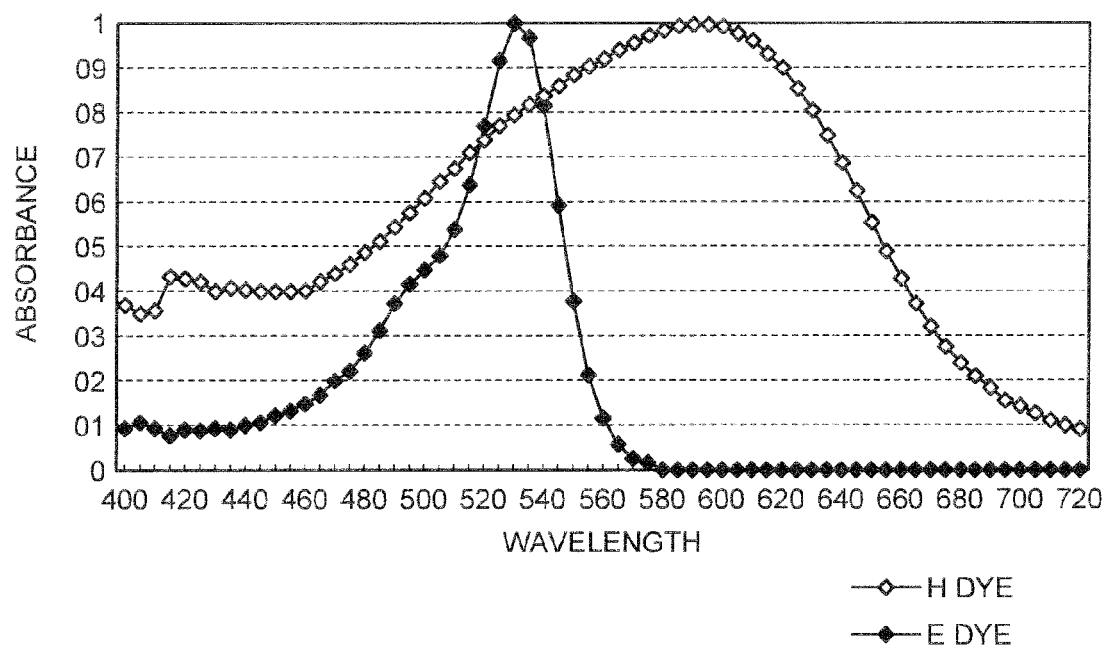
FIG. 4 is a diagram illustrating the standard dye spectral properties of an H dye and an E dye.

The standard dye spectral property data 242 stores the respective standard spectral properties of the dye such as the H dye, the E dye and the R dye (hereinafter the standard spectral properties of the dyes are referred to as the "standard dye spectral properties"). Herein, the standard dye spectral properties of the H dye are acquired by, for example, by preparing a specimen stained using the H dye (a single-stain specimen) in order to measure the spectral properties thereof using a spectrometer, in order to obtain, for example, the absorbance by using the Lambert-Beer Law. The same applies to the standard dye spectral properties of the E dye, which are acquired preparing a specimen stained using the E dye (a single-stain specimen) in order to measure the spectral properties using a spectrometer, in order to obtain, for example, the absorbance. FIG. 4 is a diagram illustrating the change curve of the standard dye spectral properties of the H dye and the change curve of the standard dye spectral properties of the E dye, which are stored in the storage unit 24 as the standard dye spectral property data 242, where the horizontal axis shows the wavelengths and the vertical axis shows the absorbance, illustrating the plot for each dye of the values of the standard dye spectral properties at each wavelength.

On the other hand, the standard dye spectral properties of the R dye are acquired by, for example, doing as follows. Namely, an unstained specimen is prepared and the RGB signal value is acquired by means of the RGB signal acquisition unit 11. Further, the transmittance $t(x,\lambda)$ at plural sample points on the unstained specimen is calculated using the Lambert-Beer Law based on the resulting RGB image, and then processed for conversion into the absorbance $a(x,\lambda)$. At this time, the sample points that are being sampled are intended to select a region of erythrocytes. Then, the average of the absorbance $a(x,\lambda)$ at the plural resulting sample points is calculated, thus obtaining the standard dye spectral properties of the R dye. Herein, the spectral properties of the R dye are considered to be unchanging.

The spectral property change model data 243 stores spectral property change models defined by modeling what will change when the standard dye spectral properties of the H dye and the E dye are modified by the dye spectral property generation process described below. Also, the specimen data 244 stores data relating to the target specimen. This specimen data 244 will be described in greater detail below, but as an example, data of the dye amounts calculated using the target specimen image, image data of the display image synthesized using the calculated dye amounts (display image data), or data on the spectral properties of each dye used to calculate the dye amounts are appropriately stored.

The signal processing unit 25 includes a dye spectral property determining unit 251 serving as a dye spectral property determining unit, a dye spectral property evaluating unit, and a dye spectral property determining unit; a subject spectral property calculation unit 252; a dye amount calculation unit 253; a correction coefficient setting unit 254; a dye amount correction unit 255; and a signal value conversion processing unit 256.

The dye spectral property determining unit 251 determines the spectral properties of the H dye and the E dye used to stain the target specimen. The multiband signal values acquired by the multiband signal acquisition unit 12 in the microscope imaging system 10 are input into the dye spectral property determining unit 251. The dye spectral property determining unit 251 uses the multiband single value to determine the spectral properties of the H dye and the E dye by varying the respective standard dye spectral properties of the H dye and the E dye and then processing to generate new spectral properties for the H dye and new spectral properties for the E dye (dye spectral property generation process).

The RGB signal values acquired by the RGB signal acquisition unit 11 in the microscope imaging system 10 are input into the subject spectral property calculation unit 252. The subject spectral property calculation unit 252, calculates (estimates) the spectral properties of the target specimen, more specifically, the transmittance of sample points on the target specimen corresponding to each pixel, based on the target specimen image in which the input RGB signal values are taken as the pixel values for each pixel.

The dye amount calculation unit 253 calculates the dye amount at each corresponding sample point based on the spectral properties of the target specimen, in which calculations have been made for each pixel of the target specimen image. When these dye amounts are calculated, the dye amount calculation unit 253 uses what has been determined by the dye spectral property determining unit 251 as the spectral properties of the H dye and of the E dye.

The correction coefficient setting unit 254 sets dye amount correction coefficients for correcting the dye amounts of the H dye and the E dye as calculated by the dye amount calculation unit 253. The dye amount correction unit 255 corrects the dye amounts of the H dye and the E dye as calculated at each pixel by the dye amount calculation unit 253, by using the dye amount correction coefficient that has been set by the correction coefficient setting unit 254. Dye amounts that have been corrected by means of the dye amount correction unit 255 are hereinafter referred to as "corrected dye amounts".

The signal value conversion processing unit 256 converts the RGB signal values of each pixel of the target specimen image based on the dye amounts calculated for each pixel and on the spectral properties of each dye used to calculate the dye amounts. In the first embodiment, the signal value conversion processing unit 256 converts the corrected dye amounts of the H dye and the E dye and the dye amount of the R dye at each pixel into image signal values (for example, RGB values), by using the spectral properties of each dye used to calculate the dye amounts. For example, the signal value conversion processing unit 256 synthesizes transmittance based on the corrected dye amounts of the H dye and the E dye and the dye amount of the R dye, and then performs processing to convert the synthesized transmittance into RGB values for each pixel. The signal value conversion processing unit 256 is provided with a spectral information adding unit 257. The spectral information adding unit 257 adds data for the spectral properties of each dye used to calculate the dye amounts to the image signal values (display image data) of each pixel converted by the signal value conversion processing unit 256, for storage in the storage unit 24 as specimen data 244.

The control unit 26 provides overarching control of the operations of the entire image processing system 1 by, for example, transferring commands and data to each unit constituting the image processing system 1, based on input signals input from the input unit 21 and on programs and data stored in the storage unit 24.

Note that in the image processing system 1 of FIG. 3, a configuration in which the microscope imaging system 10 is omitted can be implemented by a known hardware configuration that corresponds to the computer 20 of FIG. 1, in which each unit like main storage devices such as CPU and main memory, external storage devices like a hard disk and various kinds of storage mediums, communication device, output devices like a display device, and input devices is all connected, or alternatively, in which an interface device or the like, which connects the external input, is provided.

Figure 5:
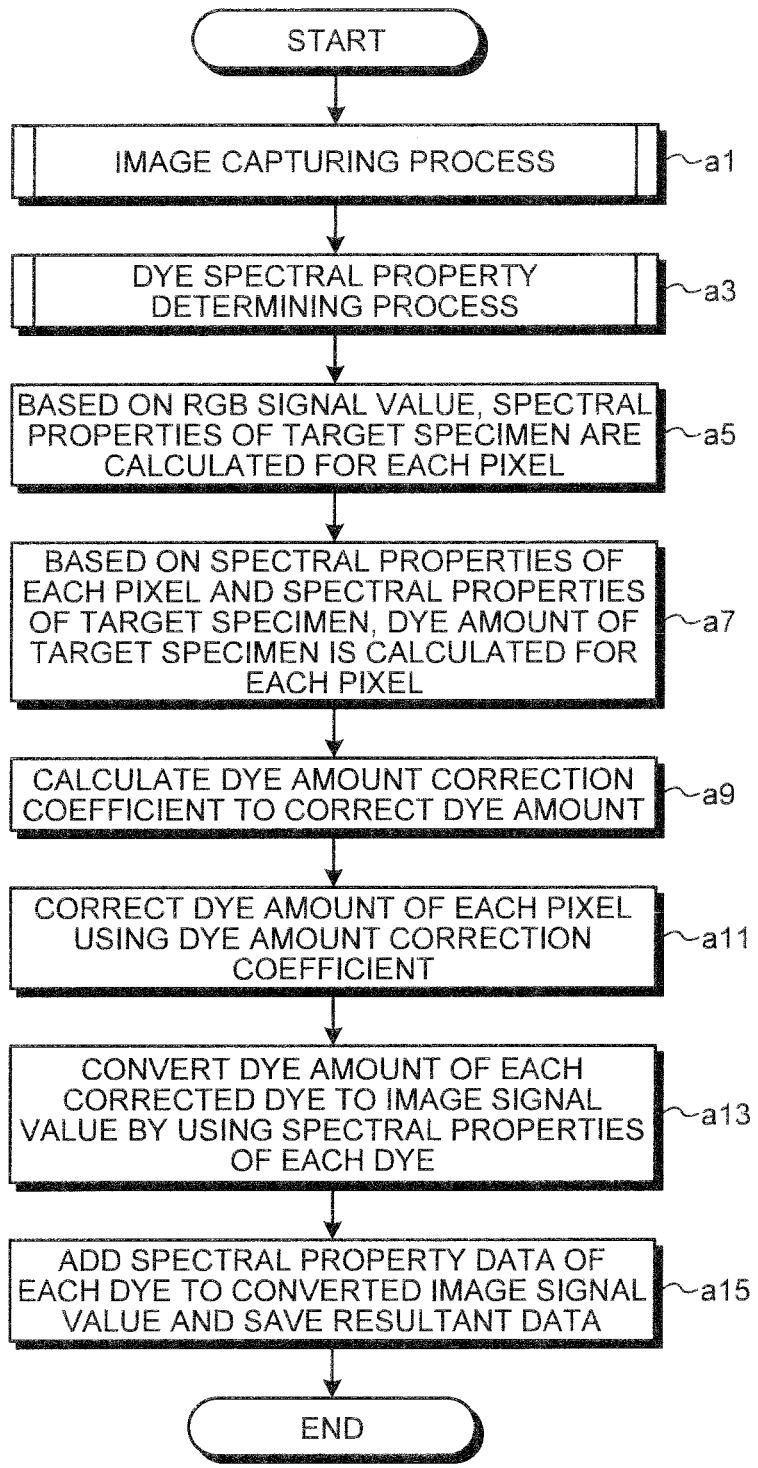
FIG. 5 is an overall flowchart illustrating the processing procedure performed by the image processing system of the first embodiment.

Next, a description will be provided for the specific processing procedure performed by the image processing system 1 of the first embodiment. FIG. 5 is an overall flowchart illustrating the processing procedure performed by the image processing system 1 of the first embodiment. Note that the processing described herein is implemented by operating each unit of the image processing system 1 according to an image processing program 241 that has been stored in the storage unit 24.

Figure 6:
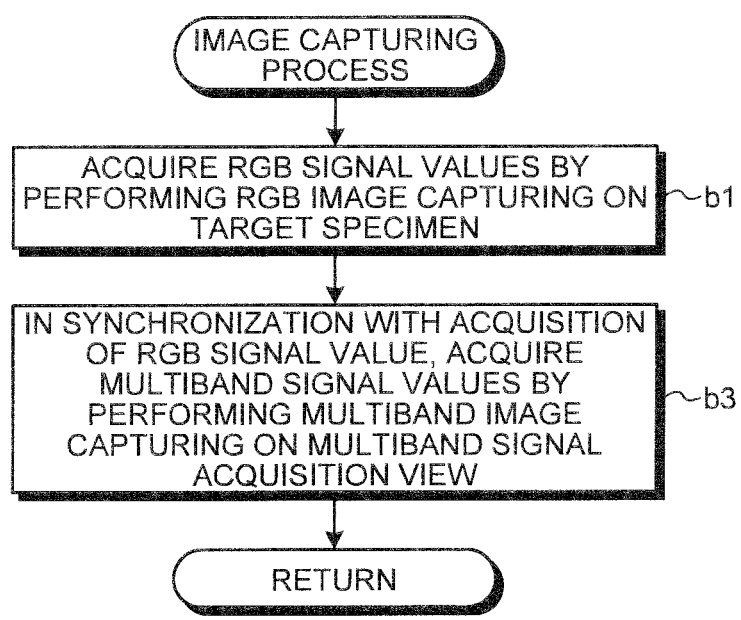
FIG. 6 is a flowchart illustrating an image capturing process in detail in the first embodiment.

Firstly, the control unit 26 executes image capturing process by controlling the operation of the microscope imaging system 10 so as to acquire RGB signal values and multiband signal values for the target specimen (step a1). FIG. 6 is a flowchart illustrating the detailed processing procedure of the image capturing process in the first embodiment.

As illustrated in FIG. 6, the control unit 26 uses the image capturing process to perform an RGB image capturing on the target specimen by means of the control of the operation of the RGB signal acquisition unit 11 in the microscope imaging system 10, thus acquiring the RGB signal values (step b1). By means of the processing herein, RGB signal values (the target specimen image) are acquired for each pixel within the RGB imaging area, and then output to the subject spectral property calculation unit 252. Further, the control unit 26 controls the operation of the multiband signal acquisition unit 12 in synchronization with the acquisition of the RGB signal values in step b1, and performs a multiband image capturing on the multiband signal acquisition view within the RGB imaging area to acquire multiband signal values (step b3). The multiband signal values in the multiband signal acquisition view acquired herein are output to the dye spectral property determining unit 251. Thereafter, the processing returns to step a1 of FIG. 5 and then proceeds to step a3.

Note that a selection may be made on whether or not to output the multiband signal values in the multiband signal acquisition view to the dye spectral property determining unit 251, depending on the values. In particular, by predetermining the wavelength bands that characterize the spectral properties of each dye, the selection may be made depending on the band signal values that have sensitivity to those wavelength bands. For example, the signal values of the corresponding bands, when large, are not output to the dye spectral property determining unit 251, because the staining of the dye being targeted is light. Conversely, the signal values of the corresponding bands, when small, are output to the dye spectral property determining unit 251, because the staining of the dye being targeted is dark. Also, further, subsequent processing, such as the dye spectral property determining process of step a3, may be weighted based on the signal values of bands having sensitivity to the wavelength bands that are predetermined as described above. For example, signal values of corresponding bands are assigned a lower weight when large, and signal values of corresponding bands are assigned a higher weight when small. In so doing, the reliability of the output values can be reflected in subsequent processing, thus improving the accuracy of the processing done by the dye spectral property determining unit 251. In addition thereto, for example, by previously generating primary components of the multiband signal values from the spectral properties of each of the plural dyes, the intensities of the primary components may be made to be output to the dye spectral property determining unit 251. Thus, the output values output to the dye spectral property determining unit 251 may be any of the values described above, and may be determined based on the steps for verifying the reliability of the values.

Further, in step a3 the dye spectral property determining unit 251 executes dye spectral property determining process.

Figure 7:
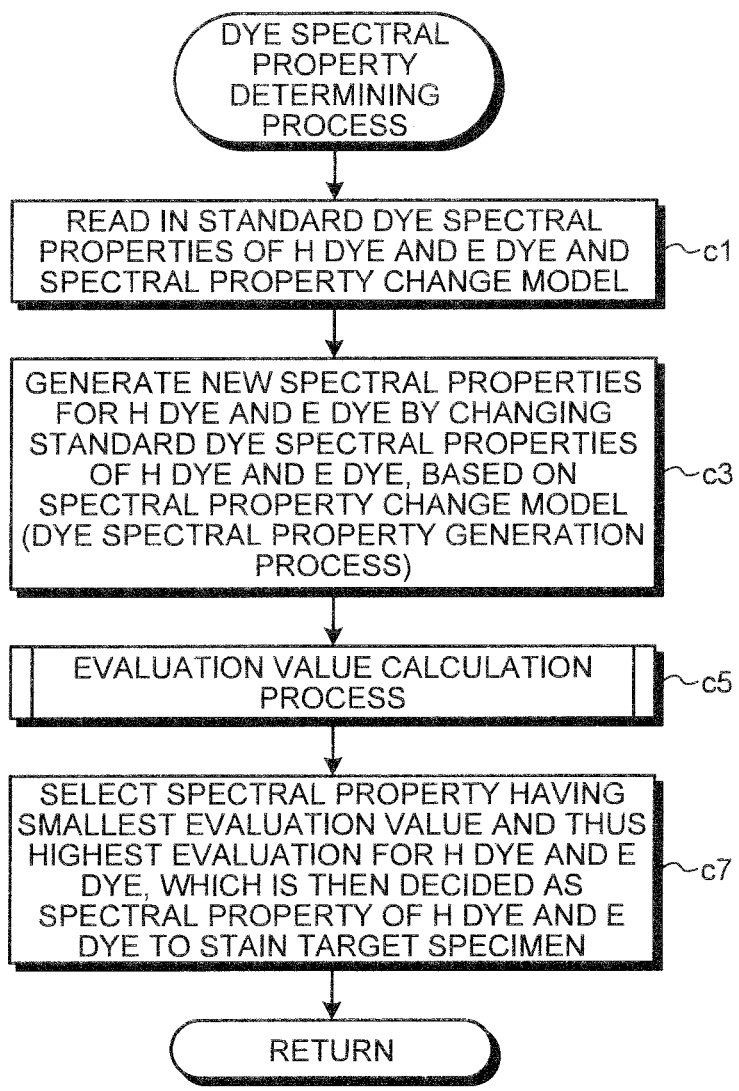
FIG. 7 is a flowchart illustrating a dye spectral property determining process in detail in the first embodiment.

In the dye spectral property determining process, the spectral properties of the H dye and the E dye used to stain the target specimen are determined by using the multiband signal values in the multiband signal acquisition view. The spectral properties of the H dye and the E dye determined herein are used in processing to calculate the dye amounts at each sample point on the target specimen corresponding to each pixel of the target specimen image in subsequent processing, and so on. FIG. 7 is a flowchart illustrating dye spectral property determining process in detail.

As illustrated in FIG. 7, in the dye spectral property determining process, the dye spectral property determining unit 251 first reads the standard dye spectral properties of the H dye and the E dye from the standard dye spectral property data 242, and then reads the spectral property change model from the spectral property change model data 243 (step c1).

Subsequently, the dye spectral property determining unit 251 executes the dye spectral property generation process (step c3). In the dye spectral property generation process, the dye spectral property determining unit 251 uses the spectral property change model in order to change the respective standard dye spectral properties of the H dye and the E dye, thus generating new spectral properties for the H dye and the E dye. Herein, the spectral property change model is not limited to being the H dye and the E dye, and may, for example, be used as defined by taking the R dye into account. Further, the spectral property change model can be defined by similar modeling even when targeting other dyes. Plural spectral property change models may also be prepared so as to then select the spectral property change model corresponding to the specimen type or to the staining procedure (preparation procedure) of the specimen for use. Herein, the specimen types include items identifying specimen such as ethnic group, organ, site, or suspected disease and the like, and staining procedures include items related to the procedure for preparing a specimen such as securing, embedding, and staining. For example, the combination of dyes or the staining sequence sometimes varies according to the staining procedure, and the combination of dyes and the staining sequence are known to contribute to the spectral property change models. In the first embodiment, for example, a spectral property change model may be used in which the method for converting the standard dye spectral properties is modeled according to the wavelength shift and the spread function of the spectral properties. In particular, the spectral property change model is represented by the conversion equation for the spectral property $k(\lambda)$ of the dyes as shown in the following Equations (27), (28).

$$\text{If } \lambda < \lambda_1 \text{ or } \lambda > \lambda_2, \text{ then } k(\lambda) = k(\lambda - \alpha) \tag{27}$$

$$\text{If } \lambda_1 < \lambda < \lambda_2, \text{ then } k(\lambda) = \text{power }(k(\lambda - \alpha), \gamma) \tag{28}$$

where, $\alpha$ is a variable that indicates the wavelength shift, which shifts the wavelength of standard dye spectral property by $\alpha$ nm; $\lambda_1$ indicates the short wavelength end applying the spread function; $\lambda_2$ indicates the long wavelength end applying the spread function; and $\gamma$ indicates the spread variable, where the standard dye spectral property is converted by $\gamma$ for a wavelength $\lambda$ that satisfies $\lambda_1 < \lambda < \lambda_2$, as shown in Equation (28).

In step c3, when the values of each variable ($\lambda$, $\gamma$, $\lambda_1$, $\lambda_2$) are given for the conversion Equations (27), (28) representing the spectral property change model, the standard dye spectral properties of the H dye and the E dye are respectively changed in order to generate new spectral properties for the H dye and the E dye. In particular, the range and variation of each variable ($\lambda$, $\gamma$, $\lambda_1$, $\lambda_2$) are pre-set, so that the value of each variable (λ, γ, λ1, λ2) is calculated according to this range and variation. Then, for each and every possible combination of values for each variable (λ, γ, λ1, λ2), plural new spectral properties are generated for the H dye and the E dye. That is, a value of each variable (λ, γ, λ1, λ2) in each combination is given for the conversion Equations (27), (28), and new spectral properties are generated by changing the standard dye spectral properties of the H dye and the E dye for each respective combination.

Figure 8:
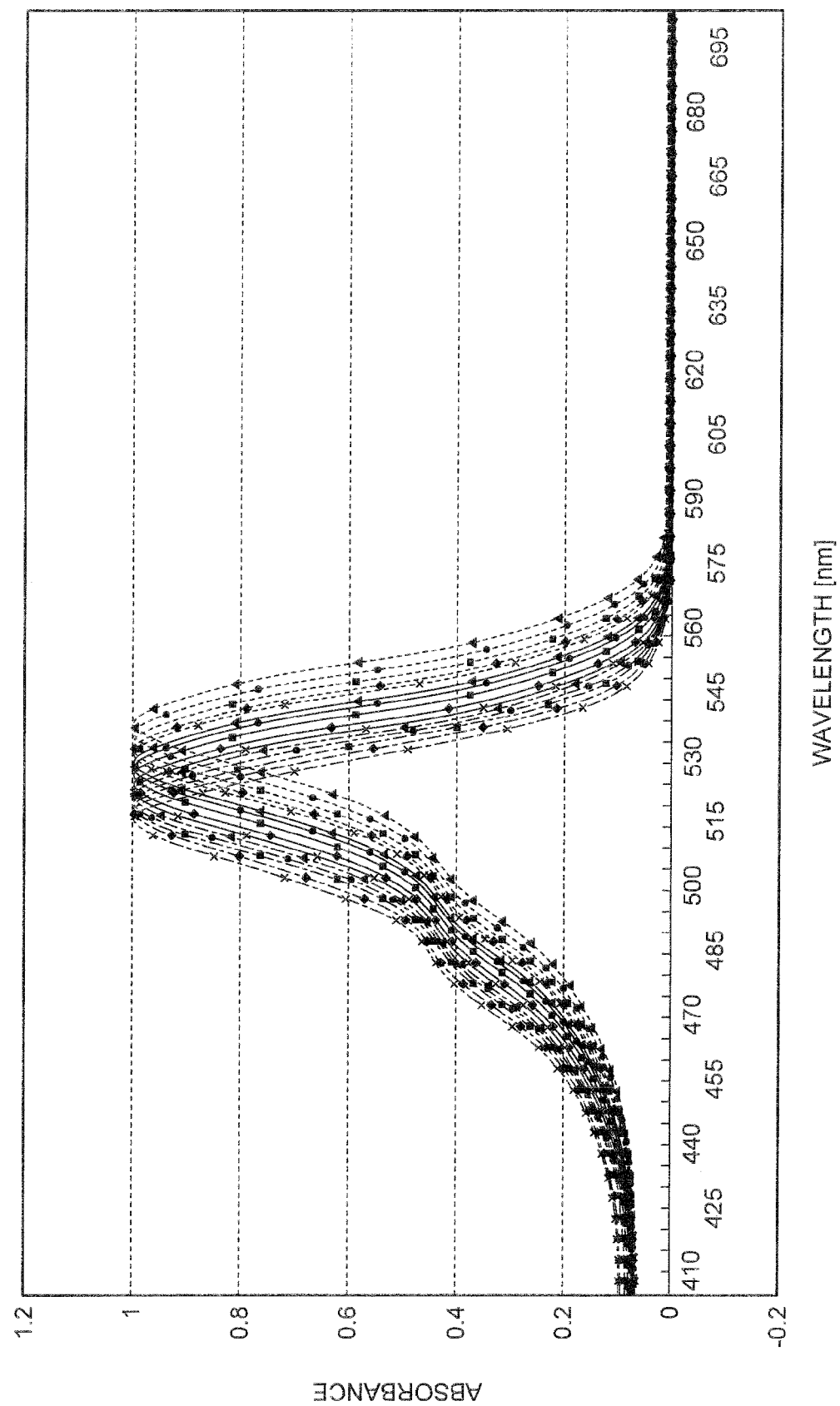
FIG. 8 is a diagram illustrating how the standard dye spectral properties of the E dye undergo wavelength shifting.

For example, the range for α, which is the wavelength shift variable is set as −10 nm to +10 nm. Also, the variation of α is set at, for example, 0.5 nm. FIG. 8 is a diagram illustrating how the wavelength of the standard dye spectral property for the E dye is shifted by setting the range of α to −10 nm to +10 nm and setting the variation to 0.5 nm.

In addition, the range for γ, which indicates the spread variable, is set as 0.5 to 2.0, and the variation thereof is set as 0.02, for example. λ1 and λ2 are, for example, set separately for each dye. That is, the value of the spectral properties of the dye is changed in a wide wavelength band for the H dye (see FIG. 4). Therefore, new spectral properties are generated for the H dye by applying Equation (28) described above for all the wavelengths, without setting λ1 and λ2. On the other hand, the value of the spectral property of the dye is virtually not changed for the E dye in the band of wavelengths shorter than 420 nm and in the band of wavelengths longer than 600 nm (see FIG. 4). For this reason, new spectral properties are generated for the E dye when λ1 is set to 420 nm and λ2 is set to 600 nm, and Equation (27) is applied to wavelengths shorter than 420 nm and to wavelengths longer than 600 nm, and Equation (28) is applied to wavelengths 420 nm to 600 nm.

Figure 9:
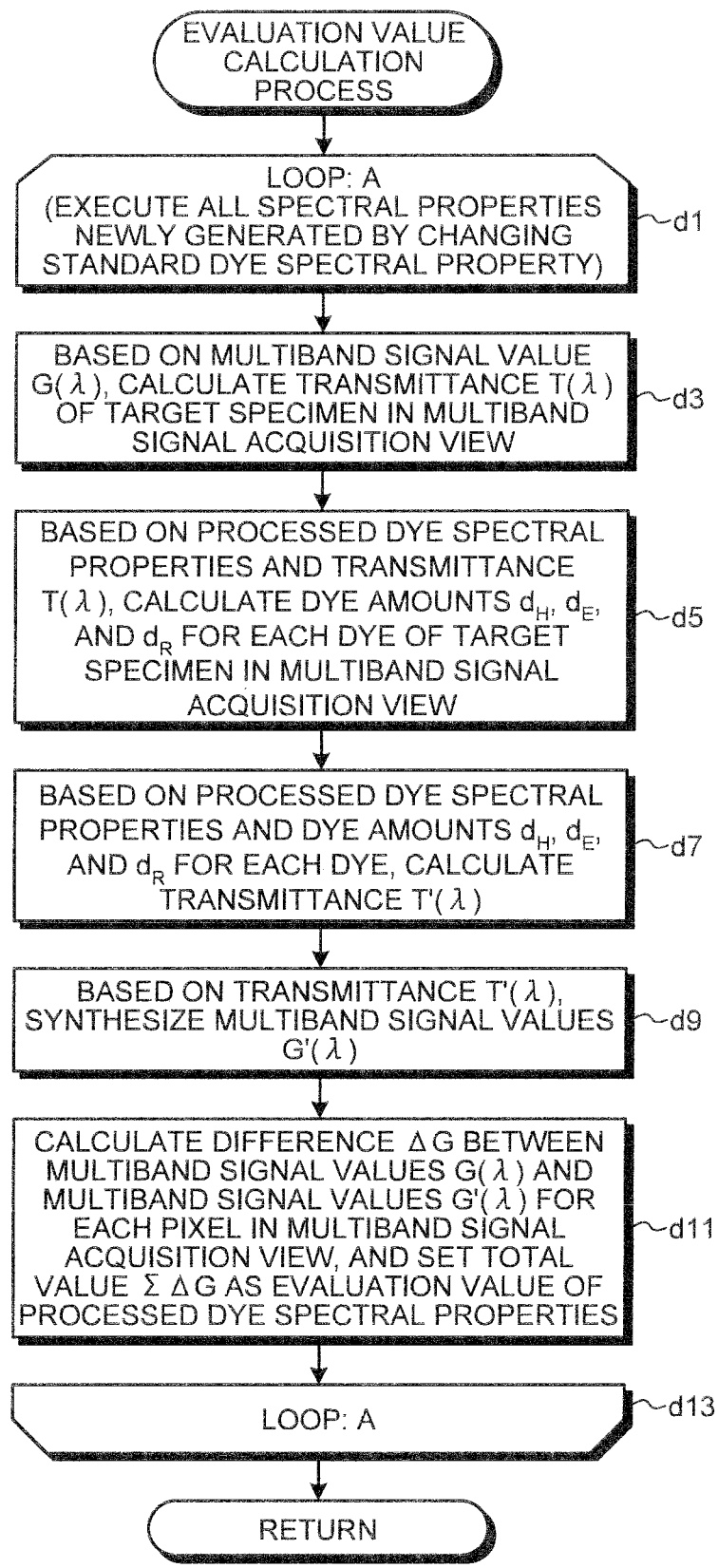
FIG. 9 is a flowchart illustrating an evaluation value calculation process in detail.

In step c5 of the subsequent FIG. 7, the dye spectral property determining unit 251 executes evaluation value calculation process. In the evaluation value calculation process, the dye spectral property determining unit 251 calculates evaluation values for all the spectral properties generated for the H dye and the E dye in step c3 by using the multiband signal values. FIG. 9 is a flowchart illustrating the detailed processing procedure for the processing of calculating evaluation values.

As illustrated in FIG. 9, in step c3, processing is performed for a loop A where all the spectral properties generated for each of every possible combination of values of each respective variable (λ, γ, λ1, λ2) for the H dye and the E dye are set as targets of sequential processing (step d1 to step d13). Note that in the description of the processing of the loop A, the spectral properties of the H dye and the E dye to be processed are referred to as "processed dye spectral properties".

In the loop A, the dye spectral property determining unit 251, for example, calculates the transmittances T(λ) of the target specimen in the multiband signal acquisition view based on the multiband signal values G(λ) acquired in step b3 of FIG. 6, more specifically, the transmittance T(λ) of each sample point on the target specimen corresponding to each pixel of the multiband signal acquisition view (step d3). In particular, in essentially the same manner as for synthesizing the display image from the multiband image of the specimen described above, according to the following Equation (29), the transmittance T(λ) is calculated at corresponding sample points on the target specimen from the matrix representation G(x) of the multiband signal values at a pixel x of the multiband signal acquisition view, which is the pixel of interest, by setting each pixel of the multiband signal acquisition view as the sequential pixel of interesting.

$$T(x) = WG(x) \tag{29}$$

Subsequently, the dye spectral property determining unit 251 calculates the dye amounts $d_H$, $d_E$, and $d_R$ for each dye of the target specimen in the multiband signal acquisition view based on the processed dye spectral properties and the transmittance T(λ) calculated in step d3 (step d5).

Note that a selection may be made whether or not to set the transmittance T(λ) as the value to be used in step d5, depending on the multiband signal value in the multiband signal acquisition view or on the value of the transmittance T(λ). In particular, a wavelength band that characterizes the spectral properties of each dye may be pre-set such that a selection may be made whether or not to use as the value to be used in step d5 depending on the transmittance of that wavelength band or on the signal value of the band having sensitivity in that wavelength band. For example, when the transmittance approaches 1 or when the signal value of the corresponding band is large, the same is not set as the value to be used in step d5, because the staining of the targeted dye is light. Conversely, when the transmittance approaches 0 or when the signal value of the corresponding band is small, the same is set as the value to be used in step d5, because the staining of the targeted dye is dark. In addition, moreover, the value to be used in step d5, such as the transmittance T(λ), may be weighted based on the value of the transmittance of the wavelength band that has been predetermined as described above, or of the signal value of the band having sensitivity in the wavelength band that has been predetermined as described above. For example, the transmittance, when approaching 1, or the signal value of the corresponding band, when large, is assigned a lower weight. On the other hand, the transmittance, when approaching 0, or the signal value of the corresponding band, when small, is assigned a stronger weight. In so doing, the reliability of the value to be used in step d5 can be made to reflect the processing in step d5 onward, thus improving the accuracy of the processing done by the dye spectral property determining unit 251. In addition thereto, for example, the primary components are generated from the spectral properties or multiband signal values of each of a plurality of dyes may be previously generated, such that the intensity of the primary components may be set as the value to be used in step d5. Thus, the value to be used in step d5 may be any of the values described above, and may be determined based on the procedure for verifying the reliability of the value.

The description now turns back to the processing of step d5. As described in Equation (7) above, the Lambert-Beer Law holds true between the intensity $I_0(\lambda)$ of incident light and the intensity I(λ) of emitted light for each wavelength λ. Also, the transmittance t(x,λ) can be converted to the absorbance a(x,λ) by using the above Equation (12). The dye amount is also calculated in step d5 by applying these equations. That is, taking the transmittance at a wavelength λ of the transmittance T(λ) as t(x,λ), the absorbance a(x,λ) at each sample point on the target specimen corresponding to each pixel (x,y) of the multiband signal acquisition view is calculated by means of the following Equation (30).

$$a(x, \lambda) = k_H(\lambda) \cdot d_H + k_E(\lambda) \cdot d_E + k_R(\lambda) \cdot d_R \tag{30}$$

However, at this time, the processed dye spectral properties are used as the spectral property $k_H$ of the H dye and the spectral property $k_E$ of the E dye. In addition, the spectral property $k_R$ of the R dye is considered to be unchanged as described above, and so is used by reading out the standard dye spectral property of the R dye from the standard dye spectral property data 242.

Thereafter, the simultaneous Equation (30) is acquired for at least three different wavelengths λ for solving the dye amounts $d_H$, $d_E$, and $d_R$ of each dye.

Subsequently, the dye spectral property determining unit 251 calculates the transmittance T'(λ) according to the following Equation (31) based on the processed dye spectral property and on the dye amounts $d_H$, $d_E$, and $d_R$ of each dye calculated in step d5 (step d7).

$$T'(\lambda)=e^{-(k_H(\lambda)\cdot d_H+k_E(\lambda)\cdot d_E+k_R(\lambda)\cdot d_R)} \quad (31)$$

The spectral property $k_R$ of the R dye uses the standard dye spectral property.

Subsequently, the dye spectral property determining unit 251 synthesizes multiband signal values G'(λ) according to the following Equation (32) based on the transmittance T'(λ) calculated in step d7 (step d9). H is the system matrix shown in the above Equation (3).

$$G'(\lambda)=HT'(\lambda) \quad (32)$$

Subsequently, the dye spectral property determining unit 251 calculates, for each pixel of the multiband signal acquisition view, the difference ΔG between the multiband signal value G(λ) acquired in step b3 of FIG. 6 and the multiband signal value G'(λ) calculated in step d9 of FIG. 9, and sets the total value ΣΔG as the evaluation value of the processed dye spectral properties (step d11). The smaller ΣΔG is, approaching 0, the smaller the difference between the multiband signal value G(λ) and the multiband signal value G'(λ), meaning that the evaluation of the processed dye spectral property is high.

After calculating the evaluation value as above, the processing of the loop A for the processed dye spectral properties is completed. Then processing, after processing having been performed for the loop A by setting all the spectral properties generated for each of the H dye and the E dye in step c3 of FIG. 7 as the processed dye spectral properties, returns to step c7 of FIG. 7.

Then, in step c7, the dye spectral property determining unit 251 selects the spectral property having the smallest evaluation value ΣΔG and thus the highest evaluation as calculated in the evaluation value calculation process of step c5 for each of the H dye and the E dye, which is then determined as the spectral property of the H dye and the E dye used to stain the target specimen. The determined spectral property of the H dye and the E dye is stored in the storage unit 24. Note that the values of each variable (α, γ, λ1, λ2), given in the conversion Equations (27), (28) when the determined spectral properties of the H dye and the E dye are generated, may be configured so as to be stored in the storage unit 24. In such a case, when the determined spectral property of the H dye and the E dye is used in subsequent processing (step a7 or step a13 of FIG. 5, for example), the standard dye spectral properties of the H dye and the E dye may be changed by giving the values of each variable (λ, γ, λ1, λ2) in the conversion Equations (27), (28), to thereafter return to step a3 of FIG. 5 and proceed on to step a5.

Then, in step a5, the subject spectral property calculation unit 252 calculates (estimates) the spectral properties of the target specimen at each pixel based on the RGB signal values of each pixel of the target specimen image acquired in step b1 of FIG. 6. In particular, according to the above Equation (5), taking each pixel of the target specimen image as sequential pixels of interest, the estimated transmittance $\hat{T}(x)$ at corresponding sample points on the target specimen are calculated as the spectral properties of the target specimen from the matrix expression G(x) of the RGB signal values at a pixel x, the pixel of interest, in the target specimen image.

Subsequently, the dye amount calculation unit 253 calculates (estimates) the dye amount of the target specimen at each pixel based on the spectral properties of each dye and on the spectral property (estimated transmittance $\hat{T}(x)$) of the target specimen calculated in step a5 (step a7). The processing procedure is conducted in an identical manner to the method for synthesizing the display image from the multiband image described above. Namely, taking the estimated transmittance $\hat{t}(x, \lambda)$ at a wavelength λ of the estimated transmittance $\hat{T}(x)$, the estimated absorbance $\hat{a}(x, \lambda)$ at each sample point on the target specimens corresponding to each pixel (x, y) of the target specimen image can be calculated by means of Equation (13) above. However, the spectral properties of the H dye and the E dye determined in step c7 of FIG. 7 are used as the spectral property $k_H$ of the H dye and the spectral property $k_E$ of the E dye at this time. For the spectral property $k_R$ of the R dye, the standard dye spectral property of the R dye is read out from the standard dye spectral property data 242 for use.

Thereafter, the simultaneous Equation (13) is acquired for at least three different wavelengths λ for solving the dye amounts $\hat{d}_H$, $\hat{d}_E$, and $\hat{d}_R$ of each dye.

In the subsequent step a9 of FIG. 5, the correction coefficient setting unit 254 sets the dye amount correction coefficient of the H dye and of the E dye according to, for example, a user operation, by performing processing to display the notification of the input request for the dye amount correction coefficient of the H dye and the E dye on the display unit 22. In particular, for example, processing is run to display on the display unit 22 a notification image in which an input box or the like is arranged for the input of respective values for the dye amount correction coefficient $\alpha_H$ of the H dye, and the dye amount correction coefficient $\alpha_E$ of the E dye, along with the display of a message stating a request for the input the dye amount correction coefficients. A user then inputs the desired dye amount correction coefficient $\alpha_H$, and inputs the desired dye amount correction coefficient $\alpha_E$, via the input unit 21. When there is no need to correct the dye amounts, values for the dye amount correction coefficients $\alpha_H$, $\alpha_E$ may not be input. In such a case, the processing of the subsequent step a11 is not executed.

Note that herein, although a description has been provided for when the dye amount correction coefficients for the H dye and the E dye are set according to a user operation, this does not constitute a limitation thereto. For example, a value may be calculated for adjusting the dye amounts at each sample point of the target specimens to an appropriate staining, to then be set as the dye amount correction coefficients $\alpha_H$, $\alpha_E$. In such a case, a standard specimen, for example, a specimen with standardized staining (a standard staining specimen), is prepared in advance in order to acquire the RGB image thereof for calculating the dye amounts at each corresponding sample point. Further, an average value for the calculated dye amount of the H dye and an average value of the dye amount of the E dye are calculated. Then, by calculating the average value for the dye amount of the H dye and the average value for the dye amount of the E dye for the target specimen as calculated in step a7, for example, the calculated average values of the dye amounts for the H dye and the E dye of the target specimen are divided by the average value of the dye amounts of the dye corresponding to the standard staining specimen, and the resulting values are taken as the dye amount correction coefficients $\alpha_H$, $\alpha_E$.

In addition, at this time, each pixel of the RGB image of the standard staining specimen is divided and classified into respective tissues, like the cellular nuclei, the cytoplasm, and erythrocytes, so that the respective average values of the dye amounts of the H dye and the E dye for each divided classification may be calculated. In such a case, each pixel of the target specimen image is similarly divided and classified, and the dye amount correction coefficients $\alpha_H$, $\alpha_E$ are calculated for each classification by calculating the respective average values for the dye amounts of the H dye and the E dye for each classification. Then, the dye amount correction coefficients to be applied to each pixel are set as the dye amount correction coefficients $\alpha_H$, $\alpha_E$ calculated for the classification to which the pixel belongs. In so doing, a more appropriate dye amount correction coefficient can be calculated for correcting the dye amount (color normalization).

Subsequently, the dye amount correction unit 255 calculates the corrected dye amounts $\hat{d}_H{}^*$, $\hat{d}_E{}^*$ for the H dye and the E dye for each pixel according to the above Equations (20), (21), from both the dye amounts $\hat{d}_H$, $\hat{d}_E$ of the H dye and the E dye calculated in step a7 and from the dye amount correction coefficients $\alpha_H$, $\alpha_E$ as set in step a9 (step a11).

Subsequently, the signal value conversion processing unit 256 converts the dye amounts for each dye after the correction in step a11 to image signal values (display image data) by using the spectral properties $k_H(\lambda)$, $k_E(\lambda)$, and $k_R(\lambda)$ of each dye used to calculate the dye amounts (the spectral properties of the H dye and the E dye determined in step c7 of FIG. 7, and the standard dye spectral properties of the R dye) (step a13).

In particular, the signal value conversion processing unit 256 firstly synthesizes the transmittances synthesized using the spectral properties $k_H(\lambda)$, $k_E(\lambda)$, and $k_R(\lambda)$ of each dye into each pixel, based on the corrected dye amounts $\hat{d}_H{}^*$, $\hat{d}_E{}^*$ of the H dye and the E dye and on the dye amount $\hat{d}_R$ of the R dye. The processing procedure is to first obtain the absorbance $\tilde{a}^*(x, \lambda)$ at each pixel x according to the above Equation (22). Note that the absorbance $a^*(x, \lambda)$ may be obtained according to the above Equation (23) when the estimated error $e(\lambda)$ is included.

Subsequently, according to the above equation (24), a new transmittance $t^*(x,\lambda)$ at each pixel x is obtained from the derived absorbances $\tilde{a}^*(x, \lambda)$.

Then, a transmittance $t^*(x,\lambda)$ is obtained by repeating D times in the wavelength direction, to obtain the corrected transmittance $T^*(x)$, which is the synthesized transmittance. The corrected transmittance $T^*(x)$ is a matrix of D rows and one column corresponding to $t^*(x,\lambda)$.

Subsequently, the signal value conversion processing unit 256 synthesizes a display image from the calculation of the image signal values of each pixel by repeatedly performing processing to convert the synthesized transmittance for each pixel (the corrected transmittance $T^*(x)$) into an RGB value over the entire image. The processing procedure is to obtain for each pixel a new pixel value $G^*(x)$ at a pixel x, to be taken as the image signal value according to the above Equation (26).

The image signal values (display image data) converted as described above are processed for display on the display unit 22 by any timing such as, for example, a timing that has been commanded by a user, in order to be presented to a user such as a physician. The user such as a physician observes the display image for use in pathological diagnoses and the like.

Thereafter, as illustrated in FIG. 5, the spectral information adding unit 257 adds the spectral properties $k_H(\lambda)$, $k_E(\lambda)$, and $k_R(\lambda)$ of each dye used to calculate the dye amounts in step a7 to the image signal values (display image data) converted in step a13 for storage (step a15).

Figure 10:
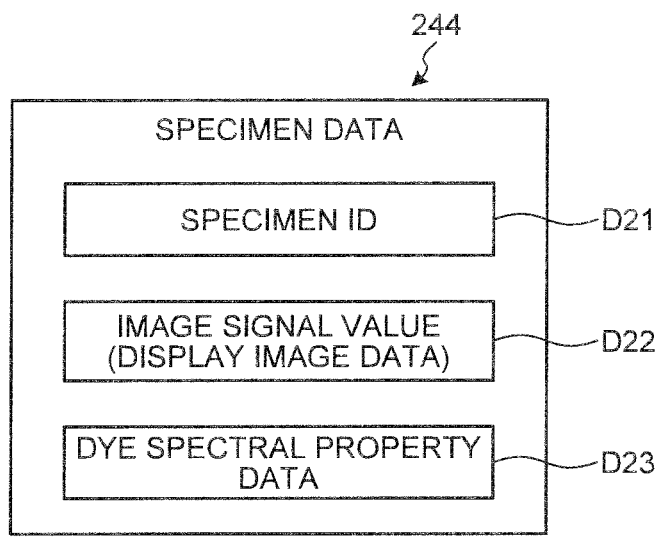
FIG. 10 is a diagram illustrating a data configuration example of specimen data.

In particular, the spectral information adding unit 257 stores, in the storage unit 24, the converted image signal values (display image data) as specimen data 244 that has been coordinated with the spectral properties $k_H(\lambda)$, $k_E(\lambda)$, and $k_R(\lambda)$ of each pixel (the spectral properties of the H dye and the E dye as set in step c7 of FIG. 7, and the standard dye spectral properties of the R dye) as well as the specimen ID of the target specimen and the like. FIG. 10 is a diagram illustrating a data configuration example of specimen data 244. The specimen data 244 illustrated in FIG. 10 includes the specimen ID D21, the image signal values (display image data) D22 storing the converted image signal values, and the dye spectral property data D23 storing the spectral properties $k_H(\lambda)$, $k_E(\lambda)$, and $k_R(\lambda)$ of each dye. The specimen ID D21 is a unique ID assigned to a specimen in order to identify specimens.

When the specimen data 244 is stored in the storage unit 24 in the manner described above the specimen data 244 can be sent to an external apparatus via the communication unit 23 by any timing such as, for example, a timing requested from the external apparatus. In so doing, the display image of the target specimen having undergone color normalization processing can be displayed on the display apparatus of the external apparatus that has received the specimen data 244, and therefore the display image of the target specimen can be observed by a physician such as from a remote location, enabling the use thereof in pathological diagnoses and the like. Further, at this time, in the external apparatus, only the image signal values (the display image data) D22 are read and processed for display, and a display image representing the dye amounts of the target specimen can be quickly presented to the user of the external apparatus.

In addition, the specimen data 244 in which the dye spectral property data D233 has been added to the image signal values (the display image data) D22 can be sent and received between external apparatuses, such that the receiving-side external apparatus can calculate the dye amounts of the target specimen based on the image signal values (the display image data) D22 and the dye spectral property data D23 once the specimen data 244 has been acquired. Accordingly, it is possible to correct the dye amounts in order to newly synthesize a display image. In so doing, the display image can be observed even while the dye amounts are being independently adjusted by the external apparatus, thus improving diagnostic efficiency.

Figure 11:
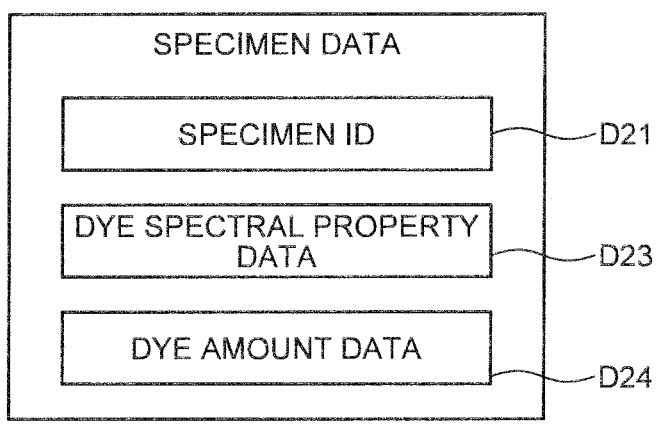
FIG. 11 is a diagram illustrating another data configuration example of specimen data.

Note that herein although the dye spectral property data is added to the image signal values (the display image data) for storage, the dye amounts calculated in step a7 may also be added to the dye spectral property data for storage. FIG. 11 is a diagram illustrating a data configuration example of specimen data in this case. The specimen data shown in FIG. 11 includes the specimen ID D21, the dye spectral property data D23, and the dye amount data D24 storing data of the corrected dye amounts $\hat{d}_H{}^*$, $\hat{d}_E{}^*$ of the H dye and the E dye, as well as the dye amount $\hat{d}_R$ of the R dye. When the specimen data of this configuration is sent and received between external apparatuses, the receiving-side external apparatus may convert the dye amount data D24 to image signal values using the dye spectral property data D23, in order to synthesize the display image.

As described above, according to the first embodiment, the spectral properties of the H dye and the E dye used to stain the target specimen can be determined by changing the standard dye spectral properties of the H dye and the E dye using spectral property change model defined by previously modeling how to change the standard dye spectral properties of the H dye and the E dye, and then evaluating the generated spectral properties of the H dye and the E dye using multiband signal values within the multiband signal acquisition view. Accordingly, the standard dye spectral properties of the H dye and the E dye can be optimized for spectral properties of the H dye and the E dye suited for the target specimen. In so doing, the spectral information of the target specimen, including the spectral properties of the dyes used to stain the target specimen, can be acquired with high accuracy and without causing an increase in the staining procedure. It is further possible to accurately calculate the dye amounts of the target specimen by using the determined spectral properties of the H dye and the E dye. Moreover, because the dye amounts can be corrected by setting dye amount correction coefficients, a display image can be synthesized in which the dye amounts of the target specimen have been adjusted to a desired staining state, thus making it possible to implement highly accurate color conversion.

First Modification

In the first embodiment, plural spectral properties are generated for the H dye and for the E dye using the spectral property change model, and one is selected from those generated in order to determine the spectral property of the H dye and the E dye used to stain the target specimen. In particular, the standard dye spectral properties of the H dye and the E dye are changed by giving a plurality of values of each variable ($\alpha$, $\gamma$, $\lambda 1$, $\lambda 2$) for the conversion Equations (27), (28) of the spectral properties $k(\lambda)$ of the dyes in order to generate plural new spectral properties for the H dye and the E dye, where the one with the highest evaluation is determined as the spectral property of the H dye and the E dye. In such a case, processing time increases proportionately to the number of combinations of values for each variable ($\alpha$, $\gamma$, $\lambda 1$, $\lambda 2$). Therein, a known genetic algorithm (GA) may be used to generate the spectral properties of the H dye and the E dye, thus determining the spectral property of the H dye and the E dye used to stain the target specimen.

Herein, the genetic algorithm is an algorithm performed by an evolutionary calculation in which an aggregate of individual forming a certain generation is taken as the basic unit. To describe the summary of the processing to which the genetic algorithm has been adapted, first an initial population is generated and individuals are selected from among the initial population. Subsequently, the next-generation population is formed by performing crossovers and mutations in the selected individuals. Thereafter, the processing is repeated for the next-generation population, with the intention of ultimately selecting the individuals with the highest fitness in order to determine the spectral properties of the H dye and the E dye used to stain the target specimen.

In the first modification, combinations of values of each variable ($\lambda$, $\gamma$, $\lambda 1$, $\lambda 2$) given for the conversion Equations (27), (28) representing the spectral property change model are used as candidate solutions, for example. Each individual is characterized with genes that exhibited the candidate solutions in a sequence of numerical values. Specifically, the characteristic genes assigned to each individual are intended to indicate the combination of values for each variable ($\lambda$, $\gamma$, $\lambda 1$, $\lambda 2$) by means of a bit pattern (bit sequence). The number of bits in the bit pattern and the partition positions of the bit pattern representing each variable ($\lambda$, $\gamma$, $\lambda 1$, $\lambda 2$) are pre-set depending on the range of each variable ($\lambda$, $\gamma$, $\lambda 1$, $\lambda 2$).

Figure 12:
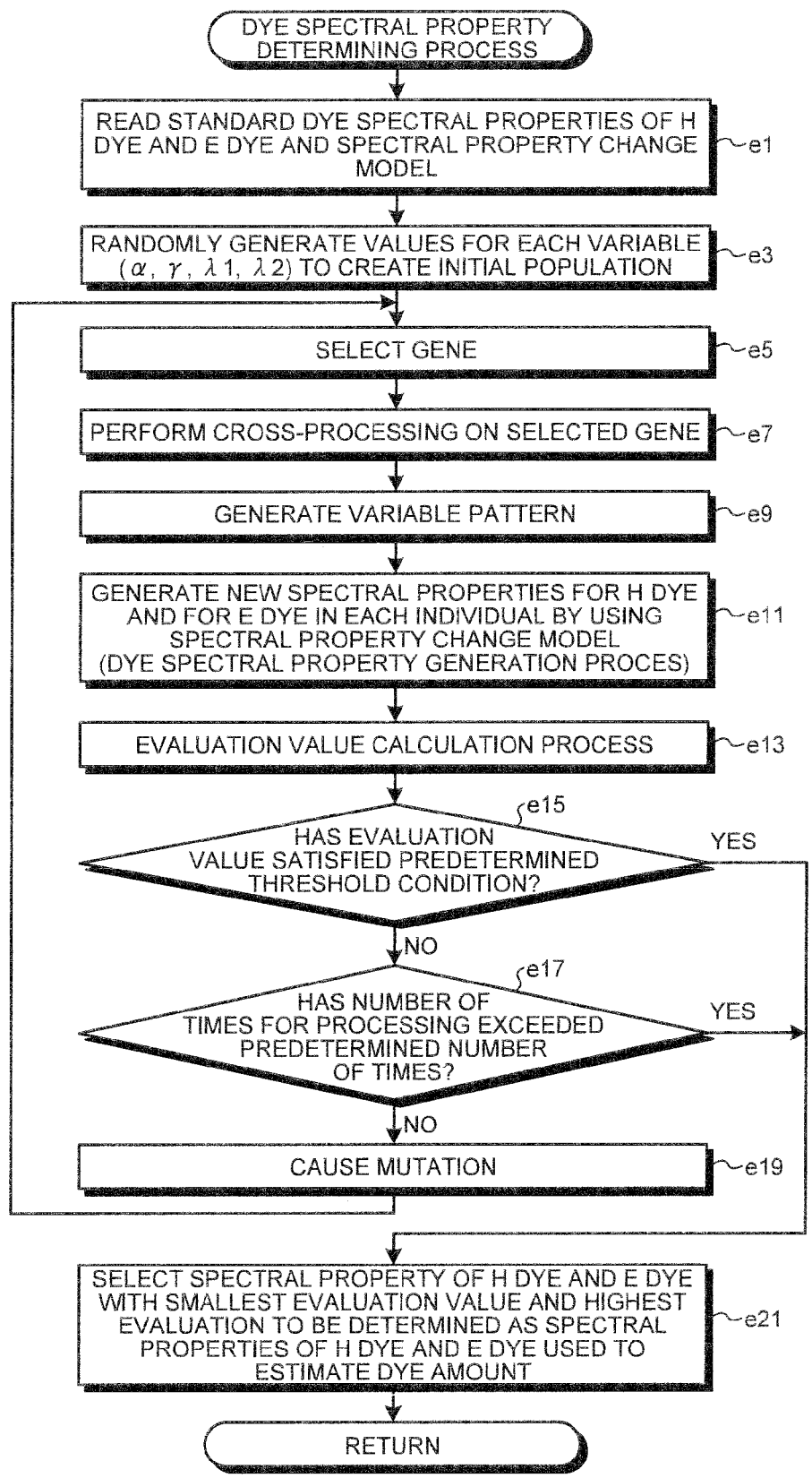
FIG. 12 is a flowchart illustrating a dye spectral property determining process in detail in a first modification.

FIG. 12 is a flowchart illustrating a dye spectral property determining process in detail in the first modification. Note that in the following description, the same numerals are assigned to the same configurations as the first embodiment. In the dye spectral property determining process of the first modification, the dye spectral property determining unit 251 first, as illustrated in FIG. 12, reads the standard dye spectral properties of the H dye and the E dye from the standard dye spectral property data 242, and reads the spectral property change models from the spectral property change model data 243 (step e1).

Subsequently, the dye spectral property determining unit 251 randomly generates values for each variable ($\alpha$, $\gamma$, $\lambda 1$, $\lambda 2$) to create an initial population (step e3). Specifically, "0" or "1" are generated for a bit pattern with a random number of bits in order to create the bit pattern, created as the genes of those individuals. The same is repeated for the pre-set number of individuals, thus obtaining the initial population. The number of individuals constituting the population can be set arbitrarily. Further, the bit pattern is not limited to when the numbers are generated randomly. For example, a distribution of random variables could be defined generating predetermined central initial values and values in the periphery of the central initial values, in order to generate the bit pattern in accordance with the random variables. In so doing, the number of times of processing described below (the number of repetitions) could be reduced when the solution is found in the vicinity of the central initial values, with the intention of speeding up the processing to determine the spectral properties of the H dye and the E dye.

Processing moves on to step e5 for targeting the initial population. That is, in step e5, the dye spectral property determining unit 251 performs selective processing to select two individuals from the target population. The selection is performed randomly by, for example, generating random variables. Note that herein, two individuals are to be selected, but by previously defining the crossover probability, it may be possible to select individuals subjected to crossover according to this crossover probability.

Then, the dye spectral property determining unit 251 performs cross-processing to take the two selected individuals as parents, and generates two new individuals that carry on the genes of these two parents (step e7). The crossover method used in the cross-processing can be appropriately selected from one-point crossover, two-point crossover and the like. For example, when one-point crossover is used, a crossover point is randomly determined and the genes of each parent beyond the determined crossover point are respectively interchanged, thus obtaining two new individuals. Further, when two-point crossover is used, two crossover points are randomly determined. Then, the genes of each parent sandwiched between the two determined crossover points are respectively interchanged, thus obtaining two new individuals. By means of the cross-processing herein, the individual parents selected in step e5 from the individuals of the target population are to be replaced by the newly generated individuals.

Subsequently, the dye spectral property determining unit 251 generates a combination pattern of the values of each variable ($\lambda$, $\gamma$, $\lambda 1$, $\lambda 2$) (a variable pattern) based on the cross-processed population (step e9). In particular, the bit pattern in which characteristic genes are assigned to each individual is split by the partition positions of each variable ($\lambda$, $\gamma$, $\lambda 1$, $\lambda 2$), thus obtaining values for each variable. By performing this processing for each individual, the resulting values of each variable ($\lambda$, $\gamma$, $\lambda 1$, $\lambda 2$) are made into the variable pattern of each individual. Thereafter, the dye spectral property determining unit 251 executes dye spectral property generation process in order to generate new spectral properties for the H dye and new spectral properties for the E dye in each individual (step e11). That is, values for each variable ($\lambda$, $\gamma$, $\lambda 1$, $\lambda 2$) are given for the conversion Equations (27), (28) according to the variable pattern, for the H dye and for the E dye, and new, respective spectral properties are generated by converting the standard dye spectral properties of the H dye and the E dye.

By performing this processing for each individual, the spectral properties of the H dye and of the E dye are obtained.

Subsequently, evaluation value calculation process (see FIG. 9) is executed in the same processing procedure as in the first embodiment, and evaluation values for all the spectral properties generated for the H dye and for the E dye in each individual in step e11 are calculated by using the multiband signal values (step e13).

Thereafter, the dye spectral property determining unit 251 uses a previously established threshold to perform threshold processing for the evaluation values calculated for each individual in the evaluation value calculation process of step e13. Then, the dye spectral property determining unit 251 determines that the threshold conditions have not been satisfied whenever the evaluation value of any of the individuals exceeds the threshold value (step e15: "No"), and proceeds on to step e17. Then, in step e17 the number of times to perform the series of processing of step e3 to step e13 (the number of repetitions) is determined, to then proceed on to step e19 as long as the predetermined number of times in which the number of times for processing has been previously established is not exceeded (step e17: "No").

In step e19, the dye spectral property determining unit 251 performs mutation processing. In particular, individuals that have been subjected to mutations are selected from individuals constituting the cross-processed population by, for example, generating random numbers with a predetermined probability (mutation rate), and the bit pattern of the genes thereof is changed. For example, a portion of the bit pattern of the genes of a selected individual that gives rise to mutations (may be either a single bit or plural bits) is selected by, for example, generating random numbers, and the bits of the selected portion are inverted. Herein, the mutation rate may be fixed, or may be dynamically established depending on the evaluation value calculated in step e13. For example, when the evaluation value is low (when the value is high), the mutation rate is set as high. On the other hand, when the evaluation value is high (when the value is low), the mutation rate is set as low. In so doing, it is possible to easily approach the optimal solution in the early point during stages when the evaluation value is low, and also possible to prevent falling into localized solutions. Further, in stages when the evaluation value is high approaching to the optimal solution, the situation in which the evaluation value plummets precipitously due to the mutation can be prevented.

Then, the generation after the mutation processing in step e19 is taken as the next-generation population and, returning to step e5, the processing for the next-generation population is repeated.

On the other hand, when the evaluation values of all the individuals are at or below the threshold value (step e15: "Yes"), or alternatively when the number of times of processing has exceeded the predetermined number of times (step e17: "Yes"), the dye spectral property determining unit 251 selects the spectral property of the H dye and the E dye with the highest evaluation (the smallest evaluation value as calculated in set e13) from the individuals constituting the final population, to be determined as the spectral property of the H dye and the E dye used to stain the target specimen (step e21). Note that the reason for terminating the dye spectral property generation process when the number of times for processing has exceeded the predetermined number of times is because the evaluation value may not fall below the predetermined threshold even when the series of processing in step e3 to step e13 is repeated, and is intended to avoid endless processing.

As described above, according to the first modification, the same efficacy is exhibited as in the first embodiment, while also applying a genetic algorithm, and therefore it is possible to determine the spectral properties of the H dye and the E dye used to stain the target specimen with a high degree of speed and accuracy. Note that this genetic algorithm has been enhanced in various fields and in various ways, and is not limited to the algorithm described above, and thus an enhanced algorithm may be applied. In so doing, the spectral properties of the H dye and the E dye used to stain the target specimen can be determined with a higher degree of speed and accuracy.

Second Modification

In the first embodiment, a description is provided for when a single target specimen image acquired by performing an RGB image capturing on the RGB imaging area of the target specimen is processed, but a similar application is possible for when processing on plural target specimen images obtained by performing the RGB image capturing on different points of the target specimen while actuating the stage 13 of the microscope imaging system 10 on the XY plane.

Figure 13:
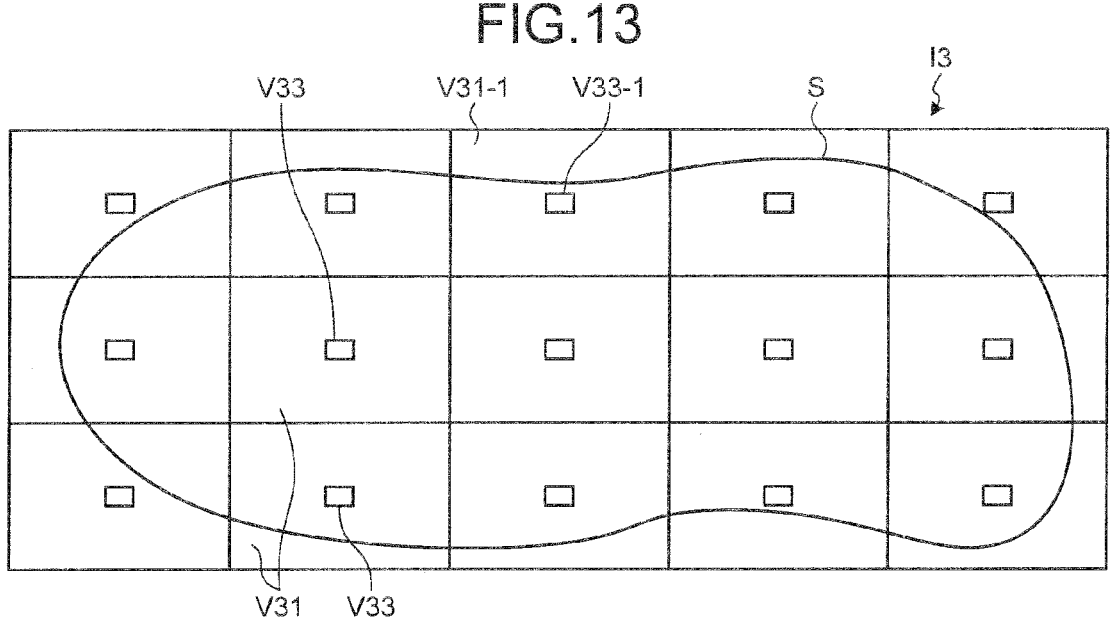
FIG. 13 is a diagram illustrating the RGB imaging area in a second modification and the multiband signal acquisition view within this RGB imaging area.

FIG. 13 is a diagram illustrating the RGB imaging areas V31 of the plural target specimen images to be subjected to the RGB image capturing, and the multiband signal acquisition view V33 within each RGB imaging area V31. In the second modification, by taking RGB photographs at each position (capturing positions) when the stage 13 is being actuated on the XY plane per each RGB imaging area V31 and acquiring plural target specimen images (15 images in FIG. 13) obtained by performing the RGB image capturing on adjacent RGB imaging areas V31, an overall image 13 reflecting a broad area of the target specimen S is obtained as a whole. Further, the multiband signal acquisition unit 12 acquires the multiband signal values in the multiband signal acquisition view V33 within the RGB imaging area V31 in synchronization with the acquisition of the RGB signal values in the RGB imaging area V31 at each capturing position by each imaging apparatus. In the second modification, spectral properties of the H dye and the E dye that have been determined using the multiband signal values of the corresponding multiband signal acquisition view V33 are applied to the target specimen image in each RGB imaging area V31. For example, for the target specimen image in the RGB imaging area V31-1, the spectral properties of the H dye and the E dye that have been determined using the multiband signal values in the multiband signal acquisition view V33-1 are applied to perform processing calculating the dye amounts and the like.

Figure 14:
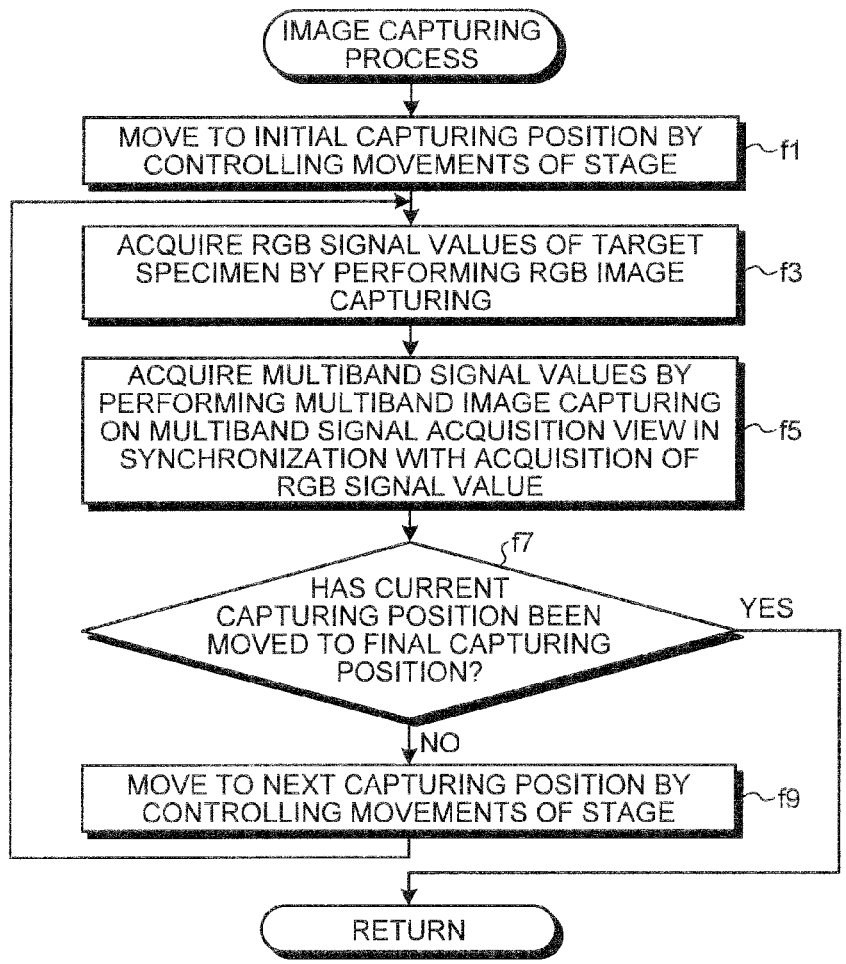
FIG. 14 is a flowchart illustrating an image capturing process in detail in the second modification.

FIG. 14 is a flowchart illustrating an image capturing process in detail in the second modification. Note that in the following description, the same numerals are assigned to the same configurations as the first embodiment.

As illustrated in FIG. 14, in the image capturing process of the second modification, first the control unit 26 actuates the stage drive unit 18 to control the movements of the stage 13 in order to move the RGB imaging area of the RGB signal acquisition unit 11 to an initial capturing position (step f1). Subsequently, the control unit 26 controls the operation of the RGB signal acquisition unit 11 of the microscope imaging system 10 and performs the RGB image capturing on the target specimen to acquire RGB signal values (step f3). Furthermore, the control unit 26 controls the operation of the multiband signal acquisition unit 12 in synchronization with the acquisition of RGB signal values in step f3, and acquires multiband signal values by performing the multiband image capturing on the multiband signal acquisition view within the RGB imaging area (step f5).

Subsequently, the control unit 26 determines whether or not the current capturing position is the final capturing position. Then, until the movement has reached the final capturing position (step f7: "No"), the control unit 26 actuates the stage drive unit 18 to control the movement of the stage 13 and moves the RGB imaging area of the RGB signal acquisition unit 11 to the next capturing position (step f9), and returns to step f3 to repeat the above-described processing. When the current capturing position is the final capturing position (step f7: "Yes"), the image capturing process is terminated.

Second Embodiment

Figure 15:
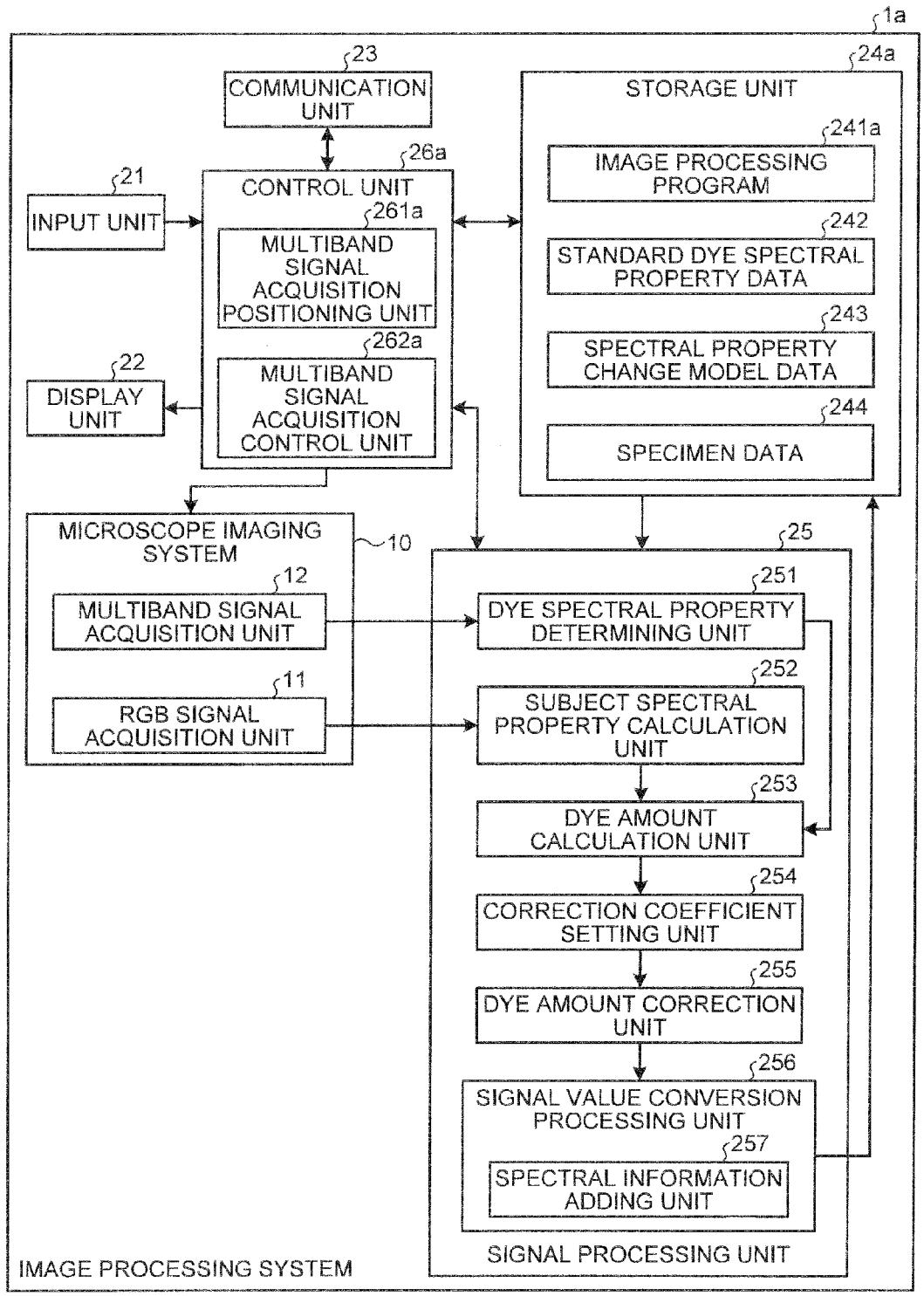
FIG. 15 is a block diagram illustrating a functional configuration example of the image processing system in a second embodiment.

FIG. 15 is a block diagram illustrating a functional configuration example of an image processing system 1a in the second embodiment. Note that the same numerals are assigned to the same configurations as the first embodiment. As illustrated in FIG. 15, the image processing system 1a includes a microscope imaging system 10, an input unit 21, a display unit 22, a communication unit 23, a storage unit 24a, a signal processing unit 25, and a control unit 26a that controls each unit of the apparatus.

The storage unit 24a stores an image processing program 241a for acquiring the spectral properties of the H dye and the E dye used to stain the target specimen by executing the processing in the second embodiment.

The control unit 26a also further includes a multiband signal acquisition positioning unit 261a and a multiband signal acquisition control unit 262a. The multiband signal acquisition positioning unit 261a receives the selection operation of the multiband signal acquisition position within the RGB imaging area via the input unit 21 and establishes the multiband signal acquisition position according to the input selection operation. The multiband signal acquisition control unit 262a moves the multiband signal acquisition view of the multiband signal acquisition unit 12 into the multiband signal acquisition position by moving the stage 13 of the microscope imaging system 10 on the XY plane, and also acquires multiband signal values by controlling the operation of the multiband signal acquisition unit 12.

Figure 16:
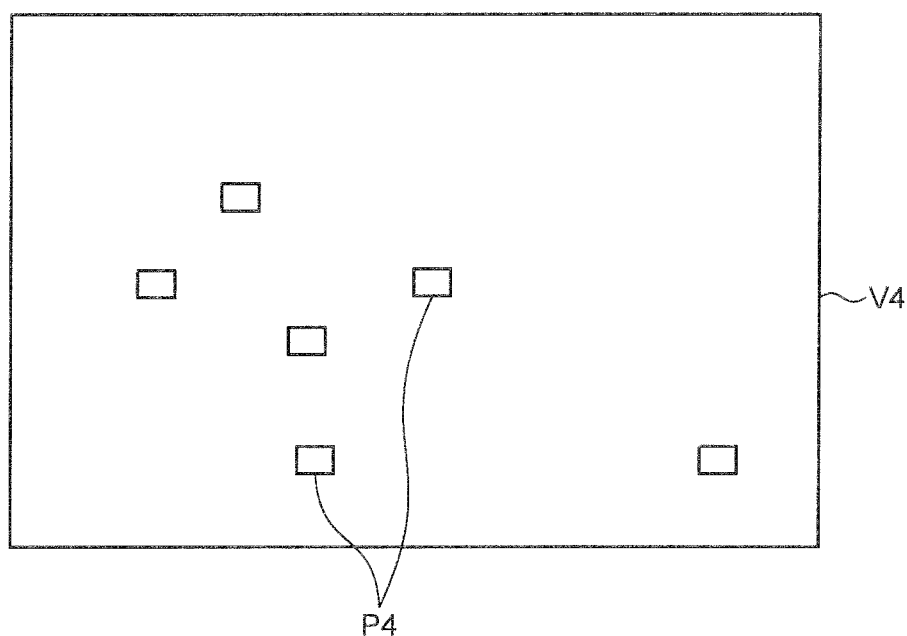
FIG. 16 is a diagram illustrating the multiband signal acquisition position in the second embodiment.

FIG. 16 is a diagram illustrating the multiband signal acquisition position P4 in the second embodiment. In the second embodiment, the positions on the stage 13 corresponding to one or more positions (six positions in FIG. 16) within the target specimen image acquired by performing the RGB image capturing on the RGB imaging area V4 are established as multiband signal acquisition positions P4 according to a user operation, and multiband signal values are acquired taking each established multiband signal acquisition position P4 as the multiband signal acquisition view. Note that although FIG. 16 portrays six positions for the multiband signal acquisition positions P4, in reality, it is preferable to select, for example, on the order of 20 positions that have been adequately stained by each dye.

Figure 17:
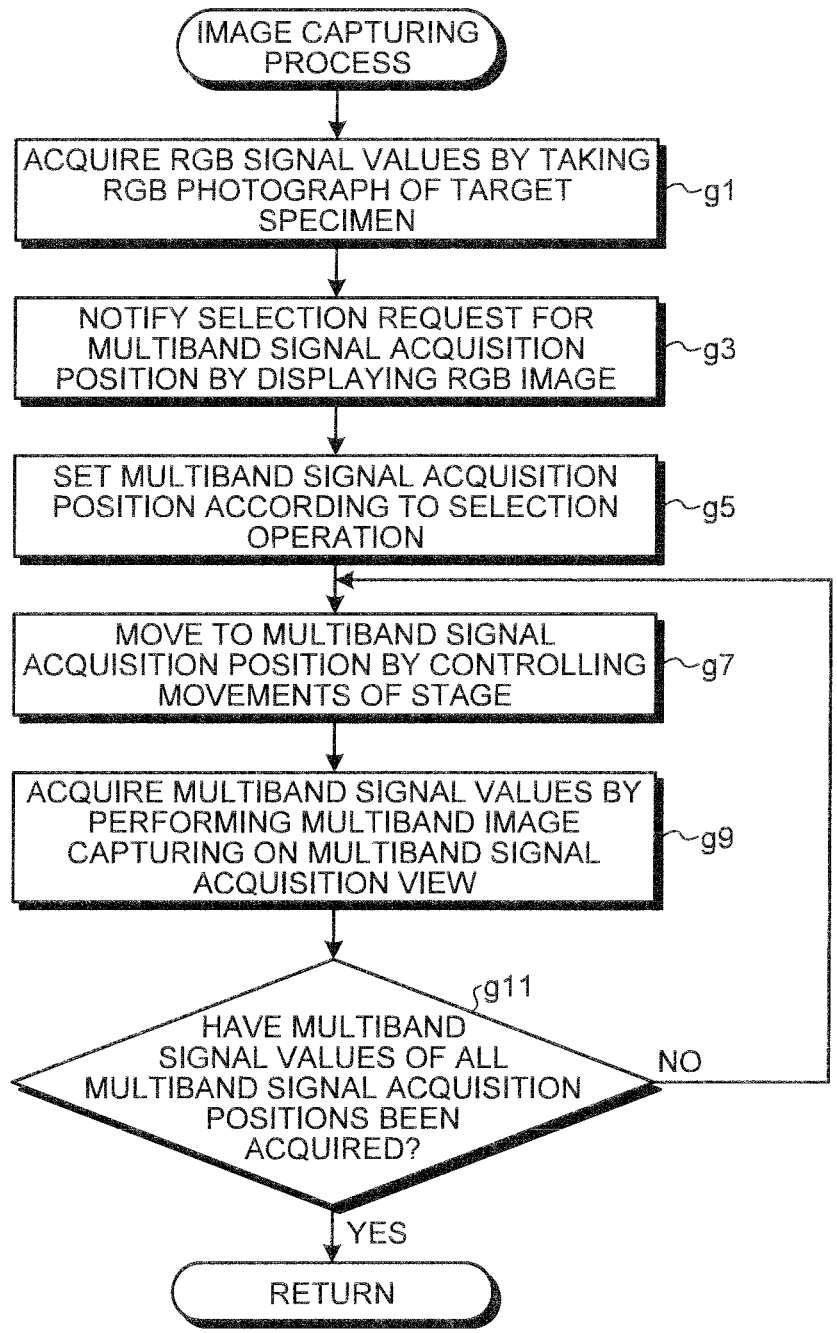
FIG. 17 is a flowchart illustrating an image capturing process in detail in the second embodiment.

Next, a description will be provided for the specific processing procedure carried out by the image processing system 1a of the second embodiment. Note that the processing as described herein is performed by the operation of each unit of the image processing system 1a in accordance with the image processing program 241a that has been stored in the storage unit 24a. In the second embodiment, the image capturing process of step a1 differs from the first embodiment in the overall flowchart of FIG. 5. FIG. 17 is a flowchart illustrating the detailed processing procedure of the image capturing process in the second embodiment.

As illustrated in FIG. 17, in the image capturing process of the second embodiment, the control unit 26a controls the operation of the RGB signal acquisition unit 11 of the microscope imaging system 10 in order to take RGB photograph of the target specimen and acquire RGB signal values (step g1).

Subsequently, the control unit 26a performs processing to display the RGB image of the target specimen on the display unit 22 based on the acquired RGB signal values, and in addition gives notification of a selection request for the multiband signal acquisition position by displaying a message that requests a selection of the multiband signal acquisition position (step g3). Then, the control unit 26a sets the position on the stage 13 corresponding to the position in the RGB image that has been selected by the operation of a user in response to the notification of the selection request as the multiband signal acquisition position (step g5). For example, the user makes the selection by, for example, clicking on a mouse constituting the input unit 21 at any position within the displayed RGB image.

Subsequently, the control unit 26a controls the movement of the stage 13 by actuating the stage drive unit 18 and positions the multiband signal acquisition position established in step g5 at the multiband signal acquisition view of the multiband signal acquisition unit 12 (step g7). Thereafter, the control unit 26a controls the operation of the multiband signal acquisition unit 12 to perform the multiband image capturing on the multiband signal acquisition view and acquire multiband signal values (step g9).

Subsequently, the control unit 26a determines whether or not multiband signal values have been acquired for all the multiband signal acquisition positions determined in step g5. Then, the control unit 26a returns to step g7 when multiband signal values have not been acquired for all the multiband signal acquisition positions (step g11: "No"), and positions the next multiband signal acquisition position to the multiband signal acquisition view of the multiband signal acquisition unit 12 by actuating the stage drive unit 18. Thereafter, the control unit 26a controls the operation of the multiband signal acquisition unit 12 in step g9 and acquires multiband signal values by performing the multiband image capturing on the multiband signal acquisition view. By means of the processing herein, the processing for step g7 to step g9 is repeated at each multiband signal acquisition position, and when plural multiband signal acquisition positions are established in step g5, respective multiband signal values for each multiband signal acquisition position are acquired. When multiband signal values have been acquired for all the multiband signal acquisition positions (step g11: "Yes"), the image capturing process is terminated.

As described above, according to the second embodiment, the same efficacy is exhibited as in the first embodiment, while also establishing, according to a user operation, the acquisition positions of the multiband signal values (the multiband signal acquisition positions) to be used when determining the spectral properties of the H dye and the E dye used to stain the target specimen.

Herein, in the dye spectral property determining process of the second embodiment, evaluation value calculation process is performed for each multiband signal acquisition position as described in FIG. 9. In particular, after new spectral properties have been generated for the H dye and the E dye by changing the standard dye spectral properties, the sum of the evaluation values is calculated for the newly generated spectral properties by using the respective multiband signal values of each multiband signal acquisition position. Then, the single spectral property with the smallest value and the highest evaluation is selected from among the sums of evaluation values of all the new spectral properties for each of the H dye and the E dye, to be determined as the spectral properties of the H dye and the E dye used to stain the target specimen.

In so doing, positions within the target specimen image that have been determined by the user to be suitable for acquiring multiband signals, in particular, positions that have been sufficiently stained by each dye, for example, can be selected, and thus the spectral properties of the H dye and the E dye used to stain the target specimen can be acquired with a higher degree of accuracy.

Third Modification

In the second embodiment, a single multiband signal acquisition position or plural thereof are set within the RGB imaging area in accordance with a user operation, to then acquire the multiband signal values of the set multiband signal acquisition positions. By contrast, when plural target specimen images are obtained by performing the RGB image capturing on different points on the target specimen as in the second modification, the second embodiment may be applied in order to set the multiband signal acquisition positions in accordance with the user operation.

Figure 18:
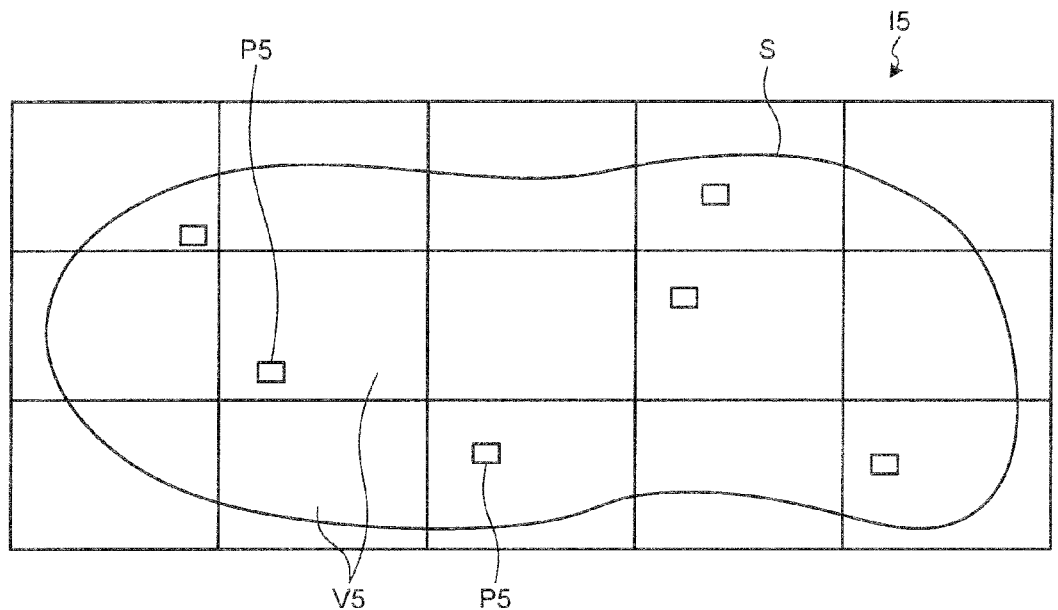
FIG. 18 is a diagram illustrating the multiband signal acquisition position in a third modification.

FIG. 18 is a diagram illustrating the multiband signal acquisition position P5 in the third modification. In the third modification, as in the second modification, the RGB image capturing is performed at each capturing position while moving the stage 13 on the XY plane to each RGB imaging area V5 one by one, and plural target specimen images (15 images in FIG. 18) are acquired by performing the RGB image capturing on the adjacent RGB imaging area V5, in order to obtain an overall image 15 reflecting a broad area of the target specimen S as a whole. Further, in the third modification, the positions on the stage 13 corresponding to one or more positions (six positions in FIG. 18) within the overall image 15 are established as the multiband signal acquisition positions P5, and the multiband signal values in which each of the established multiband signal acquisition positions P5 is taken as a respective multiband signal acquisition view are acquired.

The processing procedure in such a case is, for example, to first perform the RGB image capturing on the RGB imaging areas V5 in all the capturing positions, and then acquire plural target specimen images constituting the overall image 15. Subsequently, a notification is given for a selection request for the multiband signal acquisition positions by performing processing to display on the display unit 22 the plurality of acquired target specimen images in a row, such that positions on the stage 13 corresponding to positions within the target specimen images selected by a user operation in response to the notification of the selection request are established as the multiband signal acquisition positions. Thereafter, while sequentially positioning each of the established multiband signal acquisition positions in the multiband signal acquisition view of the multiband signal acquisition unit 12, the multiband signal values are acquired.

Note that in the dye spectral property determining process of the third modification, as in the second embodiment, the evaluation value calculation process is performed as described in FIG. 9. Further, by using each of the multiband signal values of the respective multiband signal acquisition positions, the sum of the evaluation values for the new spectral properties generated for the H dye and for the E dye is calculated. Then, the single spectral property with the smallest value and the highest evaluation is selected from among the sums of evaluation values for each of the H dye and the E dye, to be determined as the spectral properties of the H dye and the E dye used to stain the target specimen.

In the first embodiment, the multiband signal acquisition unit 12 acquires multiband signal values in synchronization with the acquisition of RGB signal values by the RGB signal acquisition unit 11. For this reason, the number of acquisitions of multiband single value increases proportionately to the number of acquisitions of target specimen images. Herein, when the number of acquisitions of multiband signal values increases, the processing time of the dye spectral property determining process (see FIG. 7) performed by using the multiband signal values increases. Also, because the positions at which the multiband signal values are acquired (in the first embodiment, the central position of the RGB imaging area) are fixed, a state may occur in which the corresponding positions on the target specimen are not sufficiently stained by the H dye and the E dye, or in which the specimen is not found at a corresponding position on the target specimen.

By contrast, according to the third modification, multiband signal values are not acquired for the entire RGB imaging area in which the target specimen image is acquired, and so it is possible, for example, to set the positions that have been judged by the user to be necessary for determining the spectral properties of the H dye and the E dye used to stain the target specimen, in particular, the positions that have been sufficiently stained by each dye, as the multiband signal acquisition positions. Accordingly, the multiband signal acquisition positions can be appropriately established, without uselessly increasing the number of acquired multiband signal values. In so doing, the spectral properties of the H dye and the E dye used to stain the target specimen can be determined with a higher degree of speed and accuracy.

Fourth Modification

In the second embodiment, a single multiband signal acquisition position or plural thereof is set within the RGB imaging area in accordance with a user operation, to then acquire the multiband signal values of the set multiband signal acquisition positions. By contrast, plural multiband signal acquisition positions may be automatically established by partitioning within the target specimen image, for example, at regular intervals.

Figure 19:
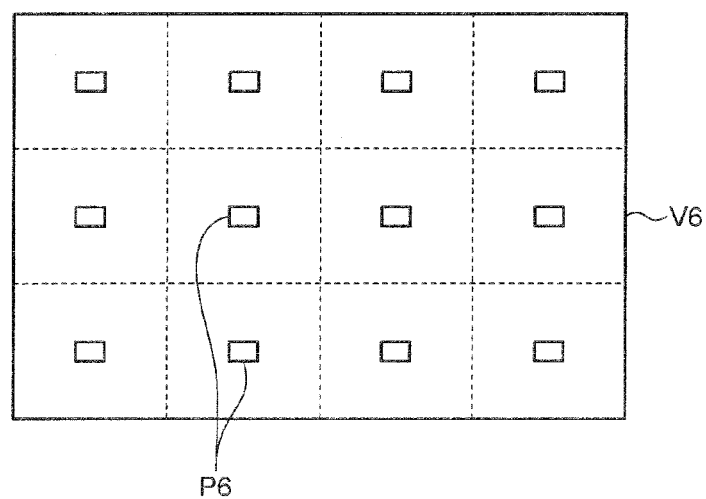
FIG. 19 is a diagram illustrating the multiband signal acquisition position in a fourth modification.

FIG. 19 is a diagram illustrating the multiband signal acquisition position P6 in the fourth modification. In the fourth modification, as illustrated by dotted line in FIG. 19, the inside of the target specimen image acquired by performing the RGB image capturing on the RGB imaging area V6 is divided equally into plural regions, where for example the central position of each region (in actuality, the position on the stage 13 corresponding to the central position) is established as the respective multiband signal acquisition position P6. In such a case, processing may be performed to calculate the position on the stage 13 corresponding to the central position of each region in which the inside of the target specimen image has been divided into equal parts instead of the processing in step g3 and step g5 in FIG. 17.

Note that in the dye spectral property determining process of the fourth modification, as in the second embodiment, the evaluation value calculation process is performed as described in FIG. 9. Then, the single spectral property with the smallest value and the highest evaluation is selected from among the sums of evaluation values of the new spectral properties for each of the H dye and the E dye, to be determined as the spectral properties of the H dye and the E dye used to stain the target specimen. Note that by selecting the single spectral property with the smallest value and the highest evaluation from the evaluation values of the new spectral properties of the H dye and the E dye in each multiband signal acquisition position, the spectral properties of the H dye and the E dye may be determined for each multiband signal acquisition position. Further, the spectral properties of the H dye and the E dye determined by using the multiband signal values of the corresponding multiband signal acquisition position may be applied to each region in which the target specimen image has been divided into equal parts in order to perform processing calculating the dye amounts and the like.

Third Embodiment

Figure 20:
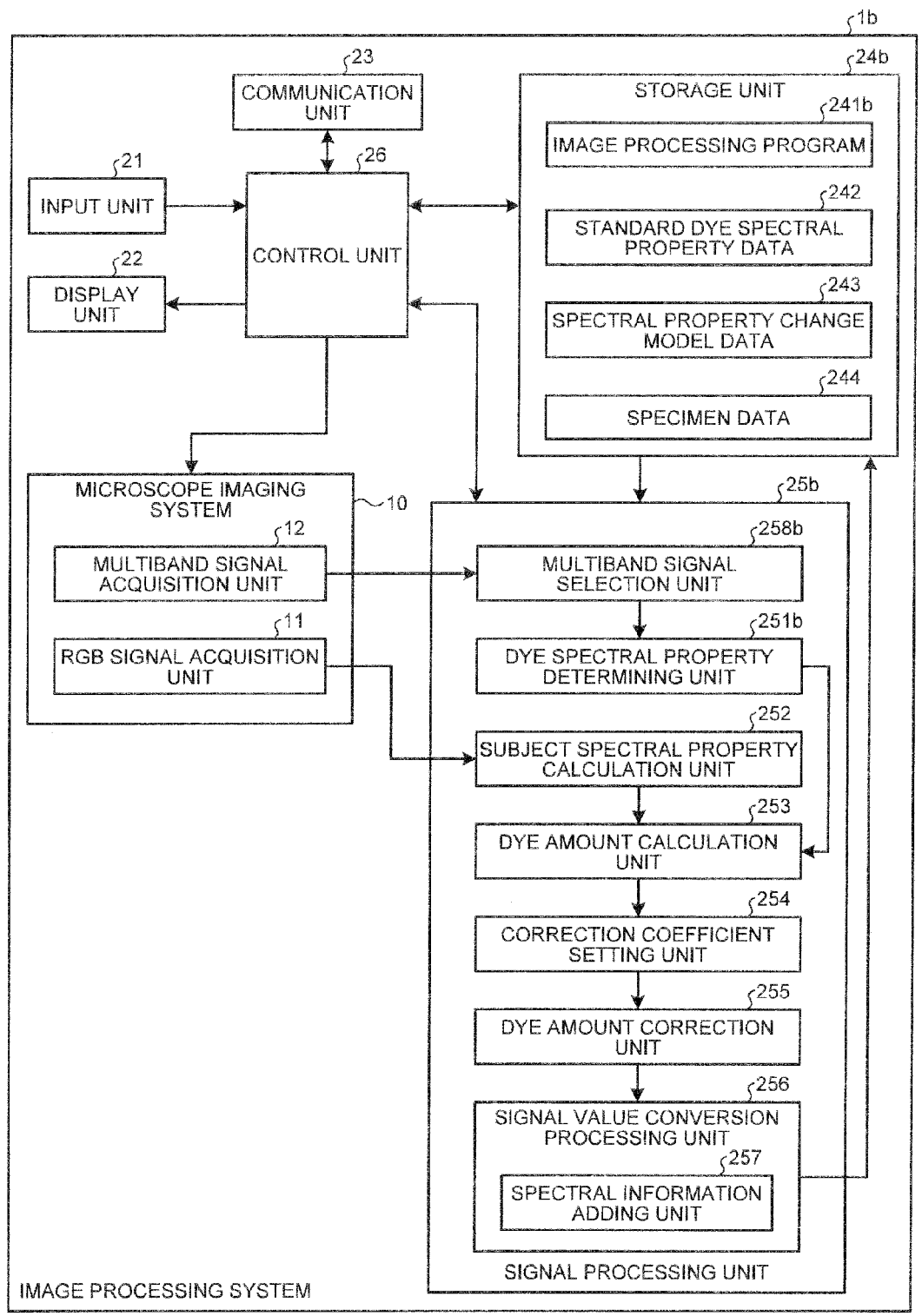
FIG. 20 is a block diagram illustrating a functional configuration example of an image processing system 1b in a third embodiment.

FIG. 20 is a block diagram illustrating a functional configuration example of an image processing system 1b in the third embodiment. Note that the same numerals are assigned to the same configurations as the first embodiment. As illustrated in FIG. 20, the image processing system 1b includes a microscope imaging system 10, an input unit 21, a display unit 22, a communication unit 23, a storage unit 24b, a signal processing unit 25b, and a control unit 26 that controls each unit of the apparatus.

The storage unit 24b stores an image processing program 241b for acquiring the spectral properties of the H dye and the E dye used to stain the target specimen by executing the processing of the third embodiment.

The signal processing unit 25b includes a multiband signal selection unit 258b, a dye spectral property determining unit 251b, a subject spectral property calculation unit 252, a dye amount calculation unit 253, a correction coefficient setting unit 254, a dye amount correction unit 255, and a signal value conversion processing unit 256.

The multiband signal values acquired by the multiband signal acquisition unit 12 in the microscope imaging system 10 are input into the multiband signal selection unit 258b. The multiband signal selection unit 258b selects a predetermined number of multiband signal values from, for example, the plural multiband signal values input from the multiband signal acquisition unit 12.

The dye spectral property determining unit 251b changes the standard dye spectral properties of the H dye and the E dye by the same processing procedure as in the first embodiment in order to perform processing to generate the spectral properties of the H dye and the spectral properties of the E dye (dye spectral property generation process), and uses the predetermined number of multiband signal values selected by the multiband signal selection unit 258b to determine the spectral properties of the H dye and the E dye used to stain the target specimen.

Figure 21A:
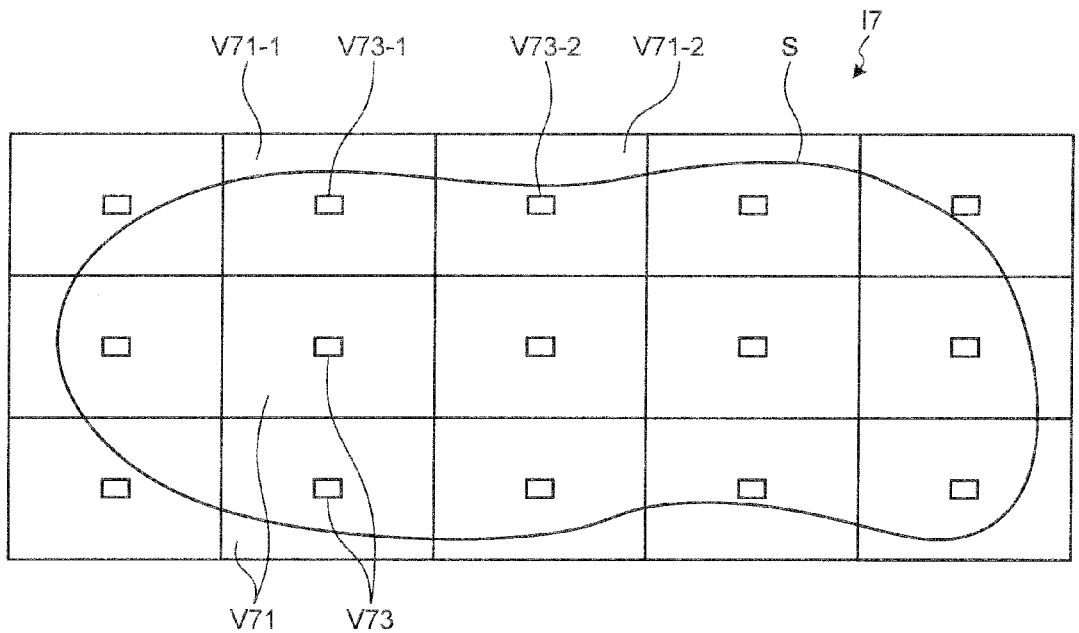
FIGS. 21A and 21B are diagrams illustrating the RGB imaging area and the multiband signal acquisition view in this RGB imaging area in the third embodiment.
Figure 21B:
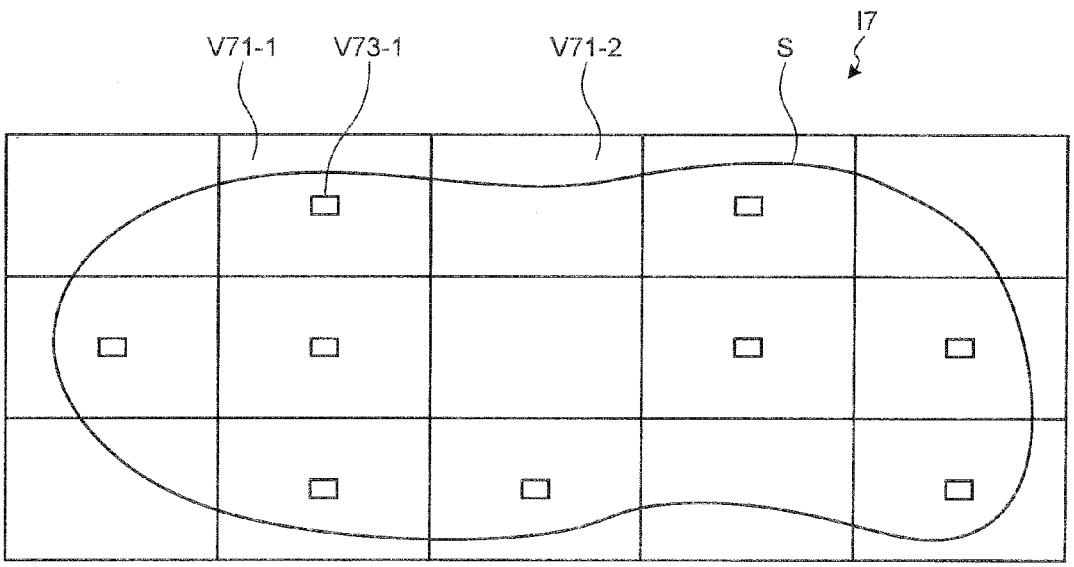

FIGS. 21A and 21B are diagrams illustrating the RGB imaging area V71 in the third embodiment as well as the multiband signal acquisition view V73 within the RGB imaging area. In the third embodiment, as in the second modification, RGB image capturing is performed at each capturing position while moving the stage 13 on the XY plane to each RGB imaging area V71 one by one, and by acquiring the plural target specimen images (15 images in FIG. 21A) in which an RGB photograph has been taken from adjacent RGB imaging areas V71, an overall image 17 is obtained reflecting a broad area of the target specimen S as a whole. Further, the multiband signal acquisition unit 12 acquires the multiband signal values in the multiband signal acquisition view V73 within the RGB imaging area V71 in synchronization with the acquisition of the RGB signal values in the RGB imaging area V71 by each imaging apparatus.

Then, in the third embodiment, multiband signal values in the predetermined number of multiband signal acquisition views V73 (nine spots in FIG. 21B) are selected, for example, from the multiband signal values in each multiband signal acquisition view V73 based on the intensity of the signals. For example, in the example in FIG. 21B, the multiband signal values in the multiband signal acquisition view V73-1 within the RGB imaging area V71-1 are selected, while no selection is made regarding the multiband signal values in the multiband signal acquisition view V73-2 within the RGB imaging area V71-2.

Figure 22:
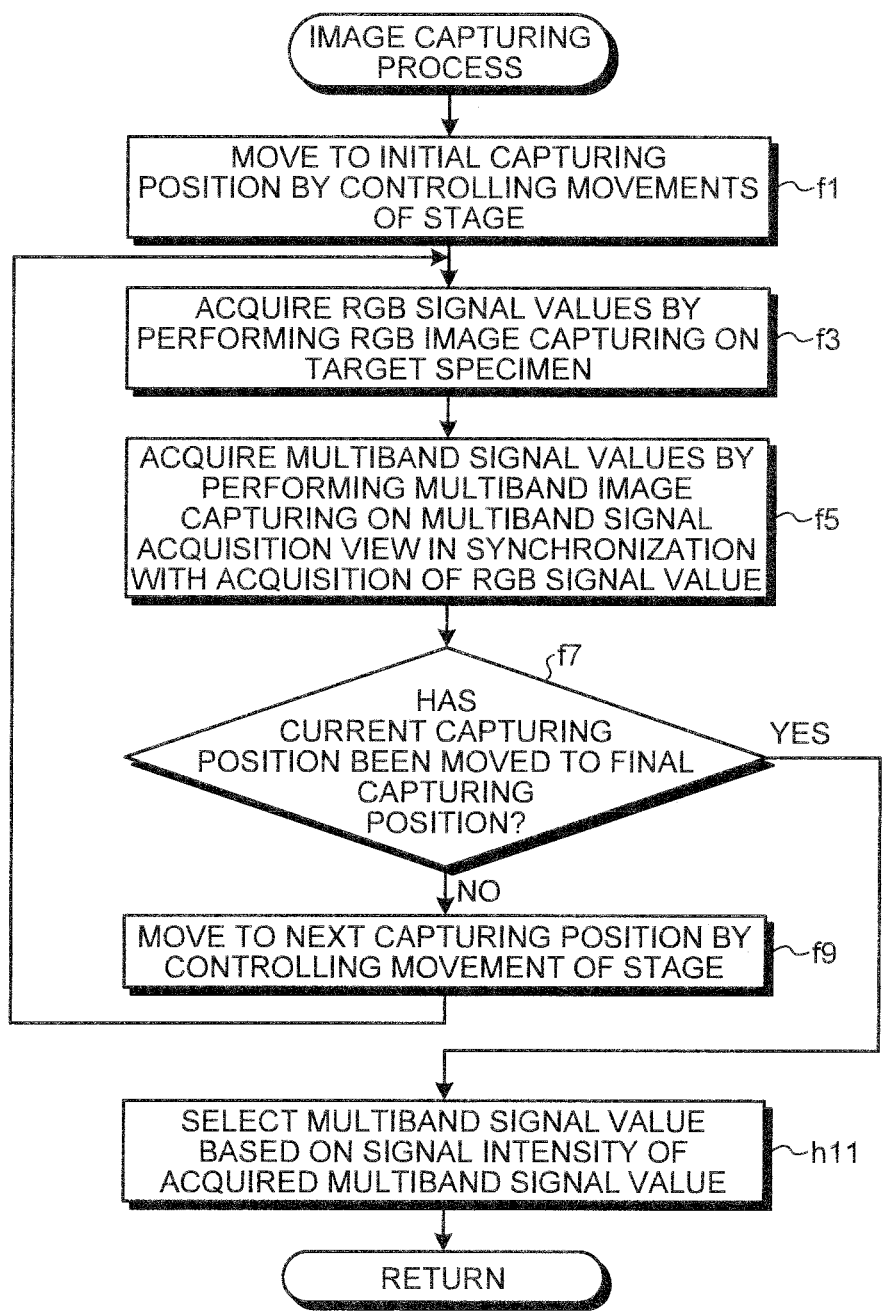
FIG. 22 is a flowchart illustrating an image capturing process in detail in the third embodiment.

Next, a description will be provided for the specific processing procedure carried out by the image processing system 1b of the third embodiment. Note that the processing described herein is performed by the operation of each unit of the image processing system 1b in accordance with the image processing program 241b stored in the storage unit 24b. In the third embodiment, the image capturing process of step a1 differs from the first embodiment in the overall flowchart of FIG. 5. FIG. 22 is a flowchart illustrating an image capturing process in detail in the third embodiment.

As illustrated in FIG. 22, in the image capturing process of the third embodiment, the control unit 26 performs the RGB image capturing on the RGB imaging area in all the capturing positions by carrying out the processing in step f1 to step f9, and performs the multiband image capturing on the multiband signal acquisition view. Note that in the image capturing process of the third embodiment, the multiband signal values in the multiband signal acquisition view acquired in step f5 are output to the multiband signal selection unit 258b.

Then, in the subsequent step h11, the multiband signal selection unit 258b selects the predetermined number of multiband signal values to be used when determining the spectral properties of the H dye and the E dye used to stain the target specimen in subsequent processing based on the signal intensity of the multiband signal values acquired in step f5. For example, of the multiband signal values acquired in each RGB imaging area, a predetermined number of those multiband single values in the pre-set range previously established by the signal intensity is selected. Herein, the number of selected multiband signal values may be arbitrarily established. Note that all of the multiband signal values that fall within the pre-set range previously established by the signal intensity may be selected. Further, plural ranges (width of the values) of the signal intensity in which the multiband single value are to be selected may be established. For example, a range of comparatively lower signal intensity, a range of medium signal intensity, and a range of comparatively higher signal intensity may be established. Then, the pre-set number of multiband signal values in which the signal intensities fall within the respective ranges may be selected one by one.

Note that in the dye spectral property determining process of the third embodiment, as in the second embodiment, the evaluation value calculation process is performed as described in FIG. 9. Also, using the respective multiband signal values of each multiband signal acquisition position, the sum of the evaluation values for the new spectral properties that have been generated for the H dye and for the E dye is calculated so that the single spectral property with the smallest value and the highest evaluation may be selected from among the sums of the evaluation values, to be determined as the spectral property of the H dye and the E dye used to stain the target specimen.

As described above, according to the third embodiment, a pre-set number of multiband signal values in which the signal intensity falls within the predetermined range is selected from among the multiband signal values acquired for each RGB imaging area. Further, the spectral property of the H dye and the E dye used to stain the target specimen can be determined by using the selected multiband signal values. Therefore, by selecting the multiband signal values with an appropriate signal intensity for determining the spectral properties of the dyes and by appropriately adjusting the number of multiband signal values to be selected, the intention of shortening the processing time (the time required to determine the spectral properties of the H dye and the E dye) for the dye spectral property determining process (see FIG. 7) can be fulfilled, and the spectral properties of the H dye and the E dye used to stain the target specimen can be determined with a higher degree of speed and accuracy.

Fifth Modification

In the third embodiment, the multiband signal values to be used when determining the spectral properties of the H dye and the E dye used to stain the target specimen are selected based on the signal intensity of the multiband signal values. By contrast, the spectral properties of the H dye and the E dye may be determined by establishing multiband signal acquisition positions based on the signal intensity of the RGB signal values acquired by performing the RGB image capturing on the RGB imaging area and using the multiband signal values of the established multiband signal acquisition positions.

Figure 23:
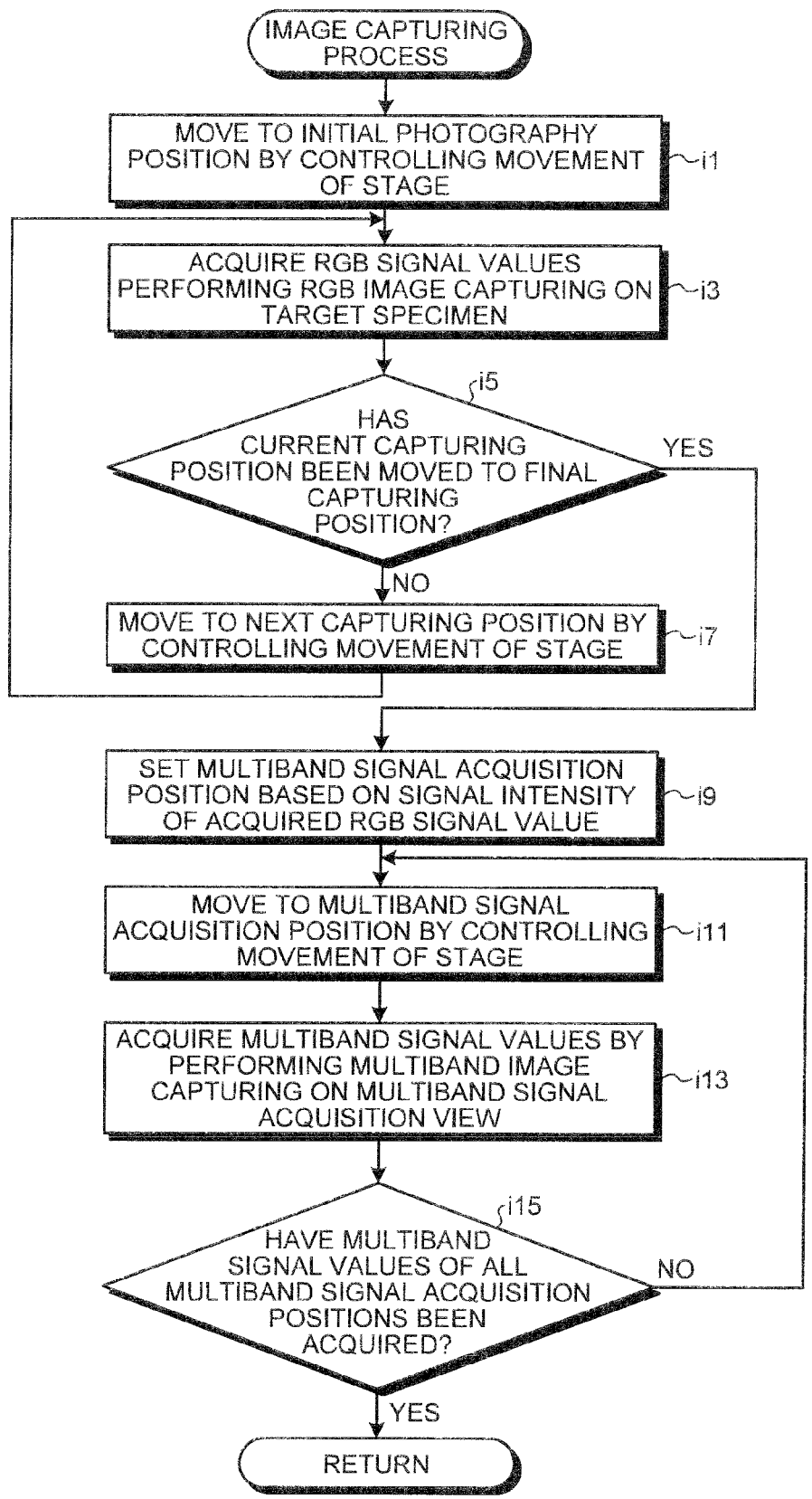
FIG. 23 is a flowchart illustrating an image capturing process in detail in a fifth modification.

FIG. 23 is a flowchart illustrating an image capturing process in detail in the fifth modification. Note that in the following description, the same numerals are assigned to the same configurations as the first embodiment.

As illustrated in FIG. 23, in the image capturing process of the fifth modification, first the control unit 26 controls the movement of the stage 13 by actuating the stage drive unit 18, and moves the RGB imaging area of the RGB signal acquisition unit 11 to the initial capturing position (step i1). Subsequently, the control unit 26 performs the RGB image capturing on the target specimen by controlling the operation of the RGB signal acquisition unit 11 of the microscope imaging system 10, and acquires the RGB signal values (step i3). Thereafter, the control unit 26 determines whether or not the current capturing position is the final capturing position. Then, until movement has reached the final capturing position (step i5: "No"), the control unit 26 actuates the stage drive unit 18 to control the movement of the stage 13 and moves the RGB imaging area of the RGB signal acquisition unit 11 to the next capturing position (step i7), and returns to step i3 to repeat the above-described processing.

On the other hand, when the current capturing position is the final capturing position (step i5: "Yes"), the control unit 26 establishes the multiband signal acquisition position based on the signal intensity of the RGB signal values acquired in step i3 (step i9). For example, a predetermined number of pixel positions is selected from among the pixel positions within the target specimen image in which the signal intensity of the RGB signal values falls within the previously established range, and the corresponding position on the stage 13 is established as the multiband signal acquisition position. The specific processing procedure may be, for example, to generate a signal intensity distribution of the RGB signal values acquired at each capturing position in step i3 and select a randomly predetermined number (for example, twenty) of RGB signal values having signal intensities that fall within the predetermined range from the generated signal intensity distribution. Thereafter, the position on the stage 13 corresponding to the coordinates of the selected RGB signal values (pixel position) is established as the multiband signal acquisition position. Herein, the number of established multiband signal acquisition positions may be arbitrarily established. Note that, as is the case in the third embodiment described above, plural ranges (widths of values) may be established for the signal intensities used to select the pixel positions on the target specimen image. For example, a range of comparatively lower signal intensity, a range of medium signal intensity and a range of comparatively higher signal intensity may be established. Further, the predetermined number of RGB signal values having signal intensities that fall within each range may be randomly selected respectively one by one from the signal intensity distribution of the RGB signals acquired at each capturing position.

Subsequently, the control unit 26 controls the movement of the stage 13 by actuating the stage drive unit 18 to position the multiband signal acquisition positions established in step i9 for the multiband signal acquisition views of the multiband signal acquisition unit 12 (step i11). Thereafter, the control unit 26 controls the operation of the multiband signal acquisition unit 12 to acquire the multiband signal values by taking a multiband photograph of the multiband signal acquisition view (step i13).

Subsequently, the control unit 26 determines whether or not multiband signal values have been acquired for all the multiband signal acquisition positions established in step i9. Further, the control unit 26 returns to step i11 when multiband signal values have not been acquired for all the multiband signal acquisition positions (step i15: "No"), and actuates the stage drive unit 18 to position to the next multiband signal acquisition position for the multiband signal acquisition view of the multiband signal acquisition unit 12. Thereafter, the control unit 26 controls the movement of the multiband signal acquisition unit 12 in step i13 to acquire the multiband signal values by performing the multiband image capturing on the multiband signal acquisition view. When multiband signal values have been acquired for all the multiband signal acquisition positions (step i15: "Yes"), the image capturing process is terminated.

Note that in the dye spectral property determining process of the fifth modification, as in the second embodiment, the evaluation value calculation process is performed as described in FIG. 9. Also, using the respective multiband signal values of each multiband signal acquisition position, the sum of the evaluation values for the new spectral properties that have been generated for the H dye and for the E dye is calculated so that the single spectral property with the smallest value and the highest evaluation may be selected from among the sums of the evaluation values, to be determined as the spectral property of the H dye and the E dye used to stain the target specimen.

As described above, according to the fifth modification, a predetermined number of RGB signal values in which the signal intensity falls within a predetermined range is selected from among the RGB signal values acquired for each RGB imaging area, and the coordinates of the selected RGB signal values (the pixel positions) can be established as the multiband signal acquisition positions. Further, by acquiring the multiband signal values at the established multiband signal acquisition positions, the acquired multiband signal values can be used to determine the spectral properties of the H dye and the E dye used to stain the target specimen. Accordingly, multiband signal acquisition positions can be selected from among the pixel positions in which the RGB signal values have a desired signal intensity, and by appropriately adjusting the number of multiband signal acquisition positions, the intention of reducing the processing time (the time required to determine the spectral properties of the H dye and the E dye) for the dye spectral property determining process (see FIG. 7) can be fulfilled, and therefore it is possible to determine the spectral properties of the H dye and the E dye used to stain the target specimen with a higher degree of speed and accuracy.

Fourth Embodiment

When a microscope is used to observe a specimen, the region that can be observed at one time (the field of view) is determined primarily by the magnification of the objective lens. Herein, as the magnification of the objective lenses increases, a higher-resolution image is obtained, while by contrast the field of view is narrowed. In order to solve this type of problem, a field of view is moved while, for example, moving a motorized stage for placing the specimen and simultaneously using a high-magnification objective lens to image each portion of the specimen image, so as to generate a specimen image (a target specimen image) that is high-resolution and has a broad range of view, by integrating the images of the respectively imaged portions, in what is called a virtual microscopy system. The specimen image generated by the virtual microscopy system is hereinafter referred to as the "VS image". According to such a virtual microscopy system, there can be observation even in an environment in which there is actually no specimen.

Figure 24:
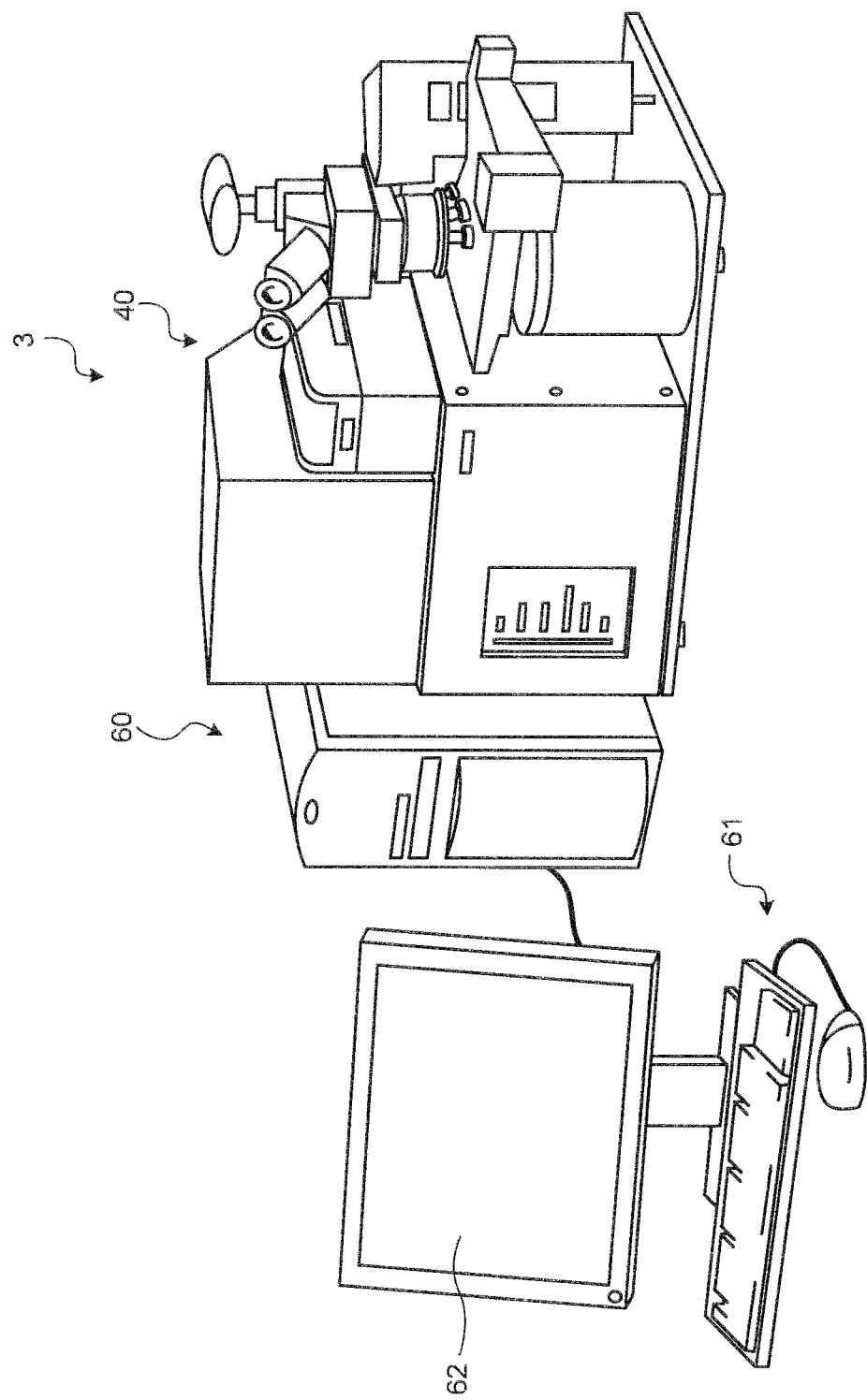
FIG. 24 is a schematic perspective view illustrating an example of the overview of the virtual microscope system in a fourth embodiment.

The fourth embodiment is intended to apply the present invention to a virtual microscopy system as described above. FIG. 24 is a schematic perspective view illustrating an example of the overview of a virtual microscope system 3 in the fourth embodiment. As illustrated in FIG. 24, the virtual microscopy system 3 is constituted by connecting a microscopy apparatus 40 with a host system 60 so as to be able to send and receive data. The host system 60 is provided with an input unit 61, such as a keyboard or a mouse, for example, and a display unit 62.

Figure 25:
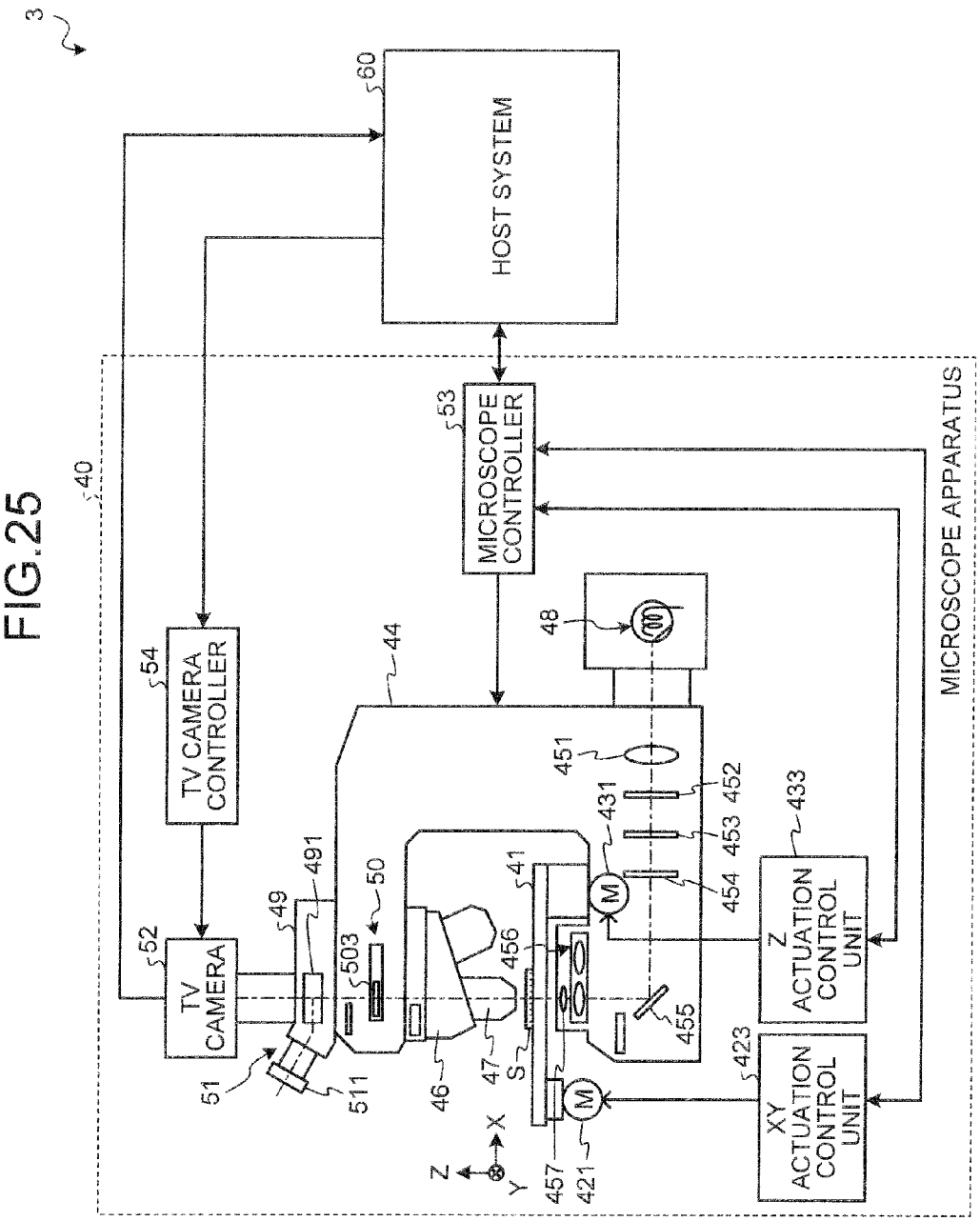
FIG. 25 is a schematic diagram illustrating an example of the overall configuration of the virtual microscope system in the fourth embodiment.

FIG. 25 is a schematic diagram illustrating an example of the overall configuration of the virtual microscope system 3 in the fourth embodiment. Herein, the optical axis direction of an objective lens 47 illustrated in FIG. 25 is taken as the Z direction, and the plane perpendicular to the Z direction is defined as the XY plane.

The microscope apparatus 40 is provided with a motorized stage 41 onto which the target specimen S is placed, a microscope body 44 that has a substantially C-shaped side view and both supports the motorized stage 41 and retains the objective lens 47 via a revolver 46, a light source 48 arranged on the bottom rear of the microscope body 44 (the right side of FIG. 25), and a lens tube 49 placed onto the upper part of the microscope body 44. Further, a binocular unit 51 for visual observation of the specimen image of the target specimen S, and a TV camera 52 for imaging the specimen image of the target specimen S are installed onto the lens tube 49. Note that the target specimen S, as in the first embodiment, is a specimen that has been stained with H&E dyes (a biological tissue sample).

The motorized stage 41 is configured so as to be freely movable in the XYZ directions. That is, the motorized stage 41 can be freely moved on the XY plane by means of a motor 421 and an XY actuation control unit 423 that controls the actuation of the motor 421. The XY actuation control unit 423 detects a prescribed origin position of the motorized stage 41 on the XY plane by means of an origin sensor of the XY position not shown in the figures based on the control of a microscope controller 53, and controls the amount of actuation by the motor 421 taking the origin position as a base point in order to then move the point of observation on the target specimen S. Then, the XY actuation control unit 423 outputs the X position and Y position of the motorized stage 41 during observation to the microscope controller 53 as appropriate. In addition, the motorized stage 41 is able to freely move in the Z direction by means of a motor 431 and a Z actuation control unit 433 that controls the actuation of the motor 431. The Z actuation control unit 433 detects a prescribed origin position in the Z direction of the motorized stage 41 by means of an origin sensor of the Z position not shown in the figures, based on the control of the microscope controller 53, and controls the amount of actuation by the motor 431, taking the origin position as a base point, in order to focusedly move the target specimen S to any Z position within a prescribed height range. Then, the Z actuation control unit 433 outputs the Z position of the motorized stage 41 during observation to the microscope controller 53 as appropriate.

The revolver 46 is causes the microscope body 44 to be retained in a freely rotatable manner, and arranges the objective lens 47 above the target specimen S. The objective lens 47 is mounted so as to be freely exchanged with other objective lenses having different magnifications (observation magnifications) for the revolver 46, and an objective lens 47 can be alternatively switched in to be used to observe the target specimen S by being inserted onto the optical path of the observation light, depending on the rotation of the revolver 46.

The microscope body 44 houses an illumination optical system for transmitting illumination onto the target specimen S at the bottom. The illumination optical system is configured by arranging in place along the optical path of the illumination light a collector lens 451 for collecting the illumination light emitted from the light source 48, an illumination system filter unit 452, a field stop 453, an aperture stop 454, a folding mirror 455 which deflects the optical path of the illumination light along the optical axis of the objective lens 47, a condenser optical element unit 456, a top lens unit 457 and the like. The illumination light emitted from the light source 48 irradiates the target specimen S by means of the illumination optical system, and is incident on the objective lens 47 as observation light.

Also, the microscope body 44 houses a filter unit 50 in the top part thereof. The filter unit 50 rotatably retains bandpass filters 503 with different spectral properties, and the bandpass filters 503 are inserted onto the optical path of the observation light in a later stage of the objective lens 47 as appropriate. In the first embodiment, the multiband signal values are acquired by means of a multiband sensor, but in the fourth embodiment, the multiband signal values are acquired by means of the filter unit 50. In particular, for example, the filter unit 50 is provided with three or more installation holes, where one hole is taken as a vacant hole, and the bandpass filters 503 are configured so as to be mounted into the remaining two or more installation holes. Further, during the multiband image capturing, the two or more bandpass filters 503 are sequentially inserted onto the optical path of the observation light by rotating the filter unit 50, in order to acquire multiband signal values by means of the TV camera 52. On the other hand, during RGB image capturing, the vacant hole described above is arranged onto the optical path of the observation light, in order to acquire RGB signal values by means of the TV camera 52. Note that although herein an example is given where the bandpass filters 503 are arranged at a later stage of the objective lens 47, there is not any limitation thereto, and it may be arranged at any position on the optical path reaching up to the TV camera 52 from the light source 48. The observation light that has passed through the objective lens 47 is incident onto the lens tube 49 after passing through the filter unit 50.

The lens tube 49 houses a beam splitter 491 that switches the optical path of the observation light that has passed through the filter unit 50 and leads to either the binocular unit 51 or the TV camera 52. The specimen image of the target specimen S is introduced into the binocular unit 51 by means of the beam splitter 491 and provides visual observation to a microscope observer via an eyepiece 511. Alternatively, imaging is provided by means of the TV camera 52. The TV camera 52 is configured to be provided with an imaging element like CCD or CMOS that images the specimen image (to give more detail, the specimen image of the view range of the objective lens 47), images the specimen image, and outputs the image data of the specimen image to the host system 60.

The microscope apparatus 40 is further provided with a microscope controller 53 and a TV camera controller 54. The microscope controller 53 provides overarching control of the operation of each unit constituting the microscope apparatus 40 based on the control of the host system 60. For example, the microscope controller 53 adjusts each unit of the microscope apparatus 40 associated with the observation of the target specimen S by performing, for example, processing to switch the objective lens 47 arranged onto the optical path of the observation light by rotating the revolver 46, adjustment control of the light source 48 or switch of the various types of optical elements depending on the magnification and the like of the switched objective lens 47, or movement commands for the motorized stage 41 for the XY actuation control unit 423 and the Z actuation control unit 433 and so on, while also giving notification to the host system 60 of the status of each unit as appropriate. The TV camera controller 54 actuates the TV camera 52 by switching ON/OF the control of the automatic gain, setting the gain, switching ON/OFF the control of the automatic exposure, setting the exposure time and the like, based on the control of the host system 60, in order to control the imaging operations of the TV camera 52.

On the other hand, the host system 60 is intended to be configured based on a configuration that removes the microscope imaging system 10 of the image processing system 1 of the first embodiment, and, in addition to the input unit 61 and the display unit 62 illustrated in FIG. 24, includes functional units corresponding to the communication unit 23, the storage unit 24, the signal processing unit 25, and the control unit 26 as illustrated in FIG. 3. Note that it is also possible to apply the configuration of the second embodiment or third embodiment, or of the first through fifth modifications.

The host system 60 transfers commands and data to each unit constituting the host system 60 based on input signals input from the input unit 61, the status of each unit of the microscope apparatus 40 input from the microscope controller 53, the image data input from the TV camera 52, or the programs and data stored in the storage unit constituting the host system 60, and the like, or alternatively commands the operation of each unit of the microscope apparatus 40 for the microscope controller 53 and the TV camera controller 54, thus providing overarching control of the entire operation of the virtual microscopy system 3. Furthermore, the host system 60 respectively processes the plural target specimen images obtained when the microscope apparatus 40 performs partial RGB image capturing on the target specimen S, in order to generate the VS image. Herein, the VS image refers to an image that has been generated by combining one or more images prepared by performing the RGB image capturing with the microscope apparatus 40. The VS image as described in the fourth embodiment refers to an image generated by combining plural high-resolution images prepared by capturing partial images of the target specimen S using a high-magnification objective lens, for example, and is a multiband image with a broad range of view and high accuracy that reflects the entirety of the target specimen S.

According to the fourth embodiment, a virtual microscopy system can be implemented in which it is possible to achieve the same effect as the first embodiment.

As described above, according to the first through fourth embodiments and the first through fifth modifications, new spectral properties are generated for each dye by changing the previously established standard dye spectral properties according to the pre-set change models, thus making it possible to determine the spectral properties of the dyes based on the newly generated spectral properties and on the multiband signal values of the specimen. Accordingly, the spectral properties of the dyes used to stain the specimen can be acquired with high accuracy and without involving any increase in the staining procedure.

Note that in each embodiment and each modification described above, a description has been provided for when the target specimen is a specimen that has been stained with H&E dye, but similar staining methods are known other than the H&E staining method. These staining methods can be broadly classified into general staining, specialized staining, and immunohistochemistry staining, but the present invention can be similarly applied to specimens that have been stained by any staining method.

Further, the present invention is not limited to each of the above-described embodiments and modifications as is, but rather plural constitution elements disclosed in each embodiment or each modification can be combined to form various different inventions. For example, several constitutional elements from overall constitutional elements illustrated in each embodiment and each modification may be removed for formation. Alternatively, the constitutional elements illustrated in different embodiments and modifications may be combined to form as appropriate.

For example, by combining the second and the third embodiments, a pre-set number of multiband signal values that have signal intensities falling within a prescribed range may be selected from among the multiband signal values at the multiband signal acquisition positions selected by a user. Further, in the first embodiment, the spectral properties of the target specimen are estimated in the subject spectral property calculation unit 252 in order to estimate the dye amounts of the target specimen based on the estimated spectral properties in the dye amount calculation unit 253. By contrast, the estimation of the spectral properties is not always necessary, and it is also possible to estimate the dye amounts of the target specimen from the target specimen image. In such a case, the subject spectral property calculation unit 252 is removed and the signal processing unit 25 (FIG. 3) or 25b (FIG. 20) is constituted, and RGB signal values acquired by the RGB signal acquisition unit 11 may be input into the dye amount calculation unit 253 such that the dye amount calculation unit 253 can estimate the dye amounts of the target specimen based on the RGB signal values.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system, comprising:
a multiband signal acquisition sensor that acquires multiband signal values from a specimen that has been stained with a plurality of dyes; and
at least one processor comprising hardware, the at least one processor implementing:
a dye spectral property determining unit that:
changes standard spectral properties that have been previously established for each dye of the plurality of dyes according to one of a plurality of spectral property change models for each dye to generate new spectral properties for each dye,
where the standard spectral properties is molded according to wavelength shift and spread function of the spectral properties, and
where the one of the plurality of spectral property change models is selected to correspond to the specimen type or the staining procedure of the specimen, and determines spectral properties of each dye based on the new spectral properties and on the multiband signal values.

2. The image processing system according to claim 1, wherein the dye spectral property determining unit includes a dye spectral property evaluation unit that evaluates the new spectral properties of each dye using the multiband signal values, and determines the new spectral properties as the spectral properties of each dye according to the evaluation results by the dye spectral property evaluation unit.

3. The image processing system according to claim 2, wherein the dye spectral property determining unit determines, for each dye, whether to set the new spectral properties as the spectral properties of the dyes according to the evaluation results by the dye spectral property evaluation unit, and repeatedly generates new spectral properties according to determination results.

4. The image processing system according to claim 1, further comprising a multiband image acquisition sensor that acquires a multiband image of the specimen,
wherein the at least one processor further implements a spectral information adding unit that adds the spectral properties of each dye determined by the dye spectral property determining unit to the multiband image and stores the spectral properties.

5. The image processing system according to claim 1, further comprising a multiband image acquisition sensor that acquires a multiband image of the specimen,
wherein the at least one processor further implements:
a dye amount calculation unit that calculates dye amounts of the plurality of dyes used to stain the specimen based on the multiband image and on the spectral properties of each dye determined by the dye spectral property determining unit; and
a signal value conversion processing unit that converts image signal values of the multiband image based on the spectral properties of each dye and the dye amounts calculated by the dye amount calculation unit.

6. The image processing system according to claim 5, wherein the at least one processor further implements:
a correction coefficient setting unit that sets dye amount correction coefficients for correcting the dye amounts calculated by the dye amount calculation unit; and
a dye amount correction unit that corrects the dye amounts by using the dye amount correction coefficients.

7. The image processing system according to claim 1, further comprising:
a multiband image acquisition sensor that acquires a multiband image of the specimen; and
an image display that displays the multiband image,
wherein the at least one processor further implements:
a multiband signal acquisition positioning unit that gives notification of a selection request for a position within the multiband image displayed on the image display unit and sets the position within the multiband image selected by an operation in response to the notification of a selection request as a multiband signal acquisition position; and
a multiband signal acquisition control unit that sequentially moves a view of the multiband signal acquisition unit to the multiband signal acquisition position to acquire the multiband signal values in the multiband signal acquisition position,
wherein the dye spectral property determining unit uses the multiband signal values at the multiband signal acquisition position to determine the spectral properties of the dye.

8. The image processing system according to claim 1, further comprising a multiband image acquisition sensor that acquires a multiband image of the specimen,
wherein the at least one processor further implements:
a multiband signal acquisition positioning unit that sets a position within the multiband image in which the multiband signal values are to be acquired as a multiband signal acquisition position based on a signal intensity of image signal values of the multiband image; and
a multiband signal acquisition control unit that sequentially moves a view of the multiband signal acquisition unit to the multiband signal acquisition position in order to acquire the multiband signal values in the multiband signal acquisition position,
wherein the dye spectral property determining unit uses the multiband signal values at the multiband signal acquisition position to determine the spectral properties of the dye.

9. The image processing system according to claim 1, further comprising a multiband image acquisition sensor that acquires a multiband image of the specimen,
wherein the at least one processor further implements:
a multiband signal acquisition positioning unit that sets a plurality of positions within the multiband image as multiband signal acquisition positions;
a multiband signal acquisition control unit that sequentially moves a view of the multiband signal acquisition unit to the multiband signal acquisition position to acquire the multiband signal values at the multiband signal acquisition position; and
a multiband signal selection unit that selects multiband signal values having signal intensities that meet a prescribed condition from among the multiband signal values at the multiband signal acquisition position,
wherein the dye spectral property determining unit uses the multiband signal values selected by the multiband signal selection unit to determine the spectral properties of each dye.

10. The image processing system according to claim 2, wherein:
the selected one of the plurality of spectral property change models is represented by a conversion equation for converting the standard spectral properties of each dye by using a plurality of variables, and
the dye spectral property determining unit displays genes according to a bit pattern showing a combination of the plurality of variables, and uses a genetic algorithm to search for a most appropriate combination of the variables to determine the spectral properties of the dye.

* * * * *